(12) United States Patent
Watson et al.

(10) Patent No.: US 7,991,997 B2
(45) Date of Patent: Aug. 2, 2011

(54) SYSTEM AND METHOD FOR PROVIDING SEARCHABLE DATA TRANSPORT STREAM ENCRYPTION

(75) Inventors: Philip Watson, Lake Forest, CA (US); Kenshi Taniguchi, Osaka (JP); Randall Schwarz, Santa Ana, CA (US)

(73) Assignee: Panasonic Avionics Corporation, Bothell, WA (US)

( * ) Notice: Subject to any disclaimer, the term of this patent is extended or adjusted under 35 U.S.C. 154(b) by 890 days.

(21) Appl. No.: 11/426,193

(22) Filed: Jun. 23, 2006

(65) Prior Publication Data

US 2006/0291803 A1    Dec. 28, 2006

Related U.S. Application Data

(60) Provisional application No. 60/693,665, filed on Jun. 23, 2005.

(51) Int. Cl.
 *H04L 29/06* (2006.01)
(52) U.S. Cl. .................. 713/160; 380/217; 380/237
(58) Field of Classification Search .................. 380/200, 380/211, 217, 237, 259, 239, 241, 212; 726/26
See application file for complete search history.

(56) References Cited

U.S. PATENT DOCUMENTS

| | | | |
|---|---|---|---|
| 5,463,656 | A | 10/1995 | Polivka et al. |
| 5,596,647 | A | 1/1997 | Wakai et al. |
| 5,617,331 | A | 4/1997 | Wakai et al. |
| 5,745,159 | A | 4/1998 | Wax et al. |
| 5,760,819 | A | 6/1998 | Sklar et al. |
| 5,790,175 | A | 8/1998 | Sklar et al. |
| 5,801,751 | A | 9/1998 | Sklar et al. |
| 5,929,895 | A | 7/1999 | Berry et al. |
| 5,953,429 | A | 9/1999 | Wakai et al. |
| 5,959,596 | A | 9/1999 | McCarten et al. |
| 5,966,442 | A | 10/1999 | Sachdev |
| 5,990,928 | A | 11/1999 | Sklar et al. |

(Continued)

FOREIGN PATENT DOCUMENTS

WO    WO 02/015579 A    9/2002

(Continued)

OTHER PUBLICATIONS

Office Action, U.S. Appl. No. 10/773,523, Oct. 5, 2006.

(Continued)

*Primary Examiner* — Minh Dinh
*Assistant Examiner* — Shaun Gregory
(74) *Attorney, Agent, or Firm* — Orrick, Herrington & Sutcliffe LLP

(57) ABSTRACT

A packetized transport stream for protecting viewing content from unauthorized access and methods for manufacturing and using same. The transport stream includes a plurality of content frames, each having a frame header and a frame payload. Each frame header includes information for handling the content frame; whereas, the frame payload includes selected viewing content for which protection from unauthorized access is desirable. By encrypting only the frame payload, the header remains unencrypted and can be applied to prepare the encrypted frame payload for presentation. The viewing content thereby can be stored in an encrypted format and can be decrypted on-the-fly as the viewing content is needed for presentation. The combination of the unencrypted frame header and the encrypted frame payload advantageously enables the viewing content to be protected against unauthorized use, copying, and dissemination without impairing the presentation of the viewing content.

90 Claims, 10 Drawing Sheets

U.S. PATENT DOCUMENTS

| | | |
|---|---|---|
| 6,201,797 B1 | 3/2001 | Leuca et al. |
| 6,208,307 B1 | 3/2001 | Frisco et al. |
| 6,249,913 B1 | 6/2001 | Galipeau et al. |
| 6,499,027 B1 | 12/2002 | Weinberger |
| 6,529,706 B1 | 3/2003 | Mitchell |
| 6,741,841 B1 | 5/2004 | Mitchell |
| 6,748,597 B1 | 6/2004 | Frisco et al. |
| 6,757,712 B1 | 6/2004 | Bastian et al. |
| 6,782,392 B1 | 8/2004 | Weinberger et al. |
| 6,796,495 B2 | 9/2004 | Stahl et al. |
| 6,807,148 B1 | 10/2004 | Eicher |
| 6,807,538 B1 | 10/2004 | Weinberger et al. |
| 6,810,527 B1 | 10/2004 | Conrad et al. |
| 6,813,777 B1 | 11/2004 | Weinberger et al. |
| 6,876,905 B2 | 4/2005 | Farley et al. |
| 6,885,863 B2 | 4/2005 | Parkman et al. |
| 6,899,390 B2 | 5/2005 | Sanford et al. |
| 6,938,258 B1 | 8/2005 | Weinberger et al. |
| 6,973,479 B2 | 12/2005 | Brady, Jr. et al. |
| 6,990,338 B2 | 1/2006 | Miller et al. |
| 7,036,889 B2 | 5/2006 | Sanfrod et al. |
| 7,100,187 B2 | 8/2006 | Pierzga et al. |
| 7,124,426 B1 | 10/2006 | Tsuria et al. |
| 7,155,010 B2 * | 12/2006 | Wee et al. ............... 380/37 |
| 7,177,638 B2 | 2/2007 | Funderburk et al. |
| 7,233,948 B1 * | 6/2007 | Shamoon et al. ............ 707/9 |
| 7,280,825 B2 | 10/2007 | Keen et al. |
| 7,299,292 B2 * | 11/2007 | Morten et al. ............ 709/231 |
| 7,454,203 B2 | 11/2008 | Levitan |
| 7,483,696 B1 | 1/2009 | Mitchell |
| 7,496,361 B1 | 2/2009 | Mitchell et al. |
| 2002/0059614 A1 | 5/2002 | Lipsanen et al. |
| 2002/0087992 A1 | 7/2002 | Bengeult et al. |
| 2002/0152470 A1 | 10/2002 | Hammond |
| 2002/0164017 A1 * | 11/2002 | Wee et al. ............... 380/37 |
| 2003/0043760 A1 | 3/2003 | Taylor |
| 2003/0055975 A1 | 3/2003 | Nelson et al. |
| 2003/0069015 A1 | 4/2003 | Brinkley et al. |
| 2003/0069990 A1 | 4/2003 | D'Annunzio et al. |
| 2003/0084130 A1 | 5/2003 | D'Annunzio et al. |
| 2003/0084451 A1 | 5/2003 | Pierzga et al. |
| 2003/0085818 A1 | 5/2003 | Renton et al. |
| 2003/0093798 A1 | 5/2003 | Rogerson |
| 2003/0107248 A1 | 6/2003 | Sanford et al. |
| 2003/0145329 A1 * | 7/2003 | Candelore ............... 725/87 |
| 2003/0148736 A1 | 8/2003 | Wright et al. |
| 2003/0160710 A1 | 8/2003 | Baumgartner et al. |
| 2003/0184449 A1 | 10/2003 | Baumgartner et al. |
| 2003/0192052 A1 | 10/2003 | Frisco et al. |
| 2003/0200546 A1 | 10/2003 | Keen et al. |
| 2003/0200547 A1 | 10/2003 | Frisco et al. |
| 2003/0217363 A1 | 11/2003 | Brady, Jr. et al. |
| 2003/0229897 A1 | 12/2003 | Frisco et al. |
| 2003/0233658 A1 | 12/2003 | Keen et al. |
| 2004/0049690 A1 * | 3/2004 | Candelore et al. ......... 713/193 |
| 2004/0077308 A1 | 4/2004 | Sanford et al. |
| 2004/0078821 A1 | 4/2004 | Frisco et al. |
| 2004/0098745 A1 | 5/2004 | Marston et al. |
| 2004/0108963 A1 | 6/2004 | Clymer et al. |
| 2004/0123094 A1 * | 6/2004 | Sprunk ............... 713/150 |
| 2004/0139467 A1 | 7/2004 | Rogerson et al. |
| 2004/0183346 A1 | 9/2004 | Sanford et al. |
| 2004/0193871 A1 * | 9/2004 | Seshadri ............... 713/154 |
| 2004/0235469 A1 | 11/2004 | Krug |
| 2004/0252965 A1 | 12/2004 | Moreno et al. |
| 2004/0252966 A1 | 12/2004 | Holloway et al. |
| 2005/0028192 A1 * | 2/2005 | Hooper et al. ............ 725/31 |
| 2005/0039208 A1 | 2/2005 | Veeck et al. |
| 2005/0202785 A1 | 9/2005 | Meyer |
| 2005/0216938 A1 | 9/2005 | Brady et al. |
| 2005/0278753 A1 | 12/2005 | Brady, Jr. et al. |
| 2005/0278754 A1 | 12/2005 | Bleacher et al. |
| 2006/0010438 A1 | 1/2006 | Brady, Jr. et al. |
| 2006/0031748 A1 | 2/2006 | Brady, Jr. et al. |
| 2006/0032979 A1 | 2/2006 | Mitchell et al. |
| 2006/0088001 A1 | 4/2006 | Reitmann et al. |
| 2006/0174285 A1 | 8/2006 | Brady, Jr. et al. |
| 2006/0217121 A1 | 9/2006 | Soliman et al. |
| 2006/0234700 A1 | 10/2006 | Funderburk et al. |
| 2006/0270373 A1 | 11/2006 | So |
| 2007/0044126 A1 | 2/2007 | Mitchell |
| 2008/0124054 A1 | 5/2008 | Bonar |
| 2008/0127278 A1 | 5/2008 | Bonar |
| 2009/0007193 A1 | 1/2009 | Correa et al. |
| 2009/0042651 A1 | 2/2009 | Prabhu et al. |

FOREIGN PATENT DOCUMENTS

| | | |
|---|---|---|
| WO | WO 03/032503 A2 | 4/2003 |
| WO | WO 03/050000 A1 | 6/2003 |
| WO | WO 2004/003696 A2 | 1/2004 |
| WO | WO 2004/008277 A2 | 1/2004 |
| WO | WO 2006/062641 A2 | 6/2006 |
| WO | WO 2006/065381 A2 | 6/2006 |

OTHER PUBLICATIONS

Office Action, U.S. Appl. No. 09/952,629, Mar. 14, 2006.
Office Action, U.S. Appl. No. 09/952,629, Dec. 1, 2006.
Office Action, U.S. Appl. No. 09/952,629, Jun. 27, 2007.
Office Action, U.S. Appl. No. 09/952,629, Oct. 27, 2008.
Office Action, U.S. Appl. No. 09/952,629, Mar. 18, 2008.
Office Action, U.S. Appl. No. 09/952,629, Jun. 2, 2009.
Office Action, U.S. Appl. No. 09/811,317, Feb. 28, 2002.
Office Action, U.S. Appl. No. 09/811,317, Aug. 13, 2002.
Office Action, U.S. Appl. No. 09/811,317, Dec. 30, 2002.
Notice of Allowance and Fees due, U.S. Appl. No. 09/811,317, Jul. 14, 2003.
Office Action, U.S. Appl. No. 08/863,448, Sep. 24, 1997.
Office Action, U.S. Appl. No. 08/863,448, Apr. 27, 1998.
Notice of Allowance, U.S. Appl. No. 08/863,448, Feb. 17, 1999.
Office Action, U.S. Appl. No. 08/479,654, Jan. 24, 1997.
Office Action, U.S. Appl. No. 08/479,654, Aug. 21, 1995.
Office Action, U.S. Appl. No. 08/479,654, Mar. 1, 1996.
Office Action, U.S. Appl. No. 08/479,654, Aug. 5, 1997.
Office Action, U.S. Appl. No. 08/071,218, Dec. 7, 1994.
Office Action, U.S. Appl. No. 08/071,218, Apr. 20, 1995.
Notice of Allowance and Fees due, U.S. Appl. No. 08/071,218, Aug. 7, 1995.
Office Action, U.S. Appl. No. 08/480,666, Feb. 9, 1996.
Notice of Allowance and Fees due, U.S. Appl. No. 08/480,666, Sep. 5, 1996.
Office Action, U.S. Appl. No. 08/480,666, Oct. 16, 1996.
Office Action, U.S. Appl. No. 08/480,666, Nov. 22, 1996.
Office Action, 2004-199893, Jul. 5, 2005.
Office Action, 2006-000840, Feb. 28, 2007.
Office Action, U.S. Appl. No. 08/363,228, Oct. 3, 1995.
Office Action, U.S. Appl. No. 08/363,228, Mar. 27, 1996.
Notice of Allowance and Fees due, U.S. Appl. No. 08/363,228, Apr. 9, 1996.
Office Action, U.S. Appl. No. 10/772,565, Mar. 4, 2009.
International Search Report, PCT/US2004/017666, Apr. 2, 2005.
Communication, App. No. 04754296.4-1241, Apr. 4, 2007.
First Report, App No. 2004251677, Sep. 26, 2008.
Office Action, U.S. Appl. No. 11/123,327, Dec. 11, 2008.
International Search Report, PCT/US2005/016513, Sep. 8, 2005.
International Preliminary Report, PCT/US2005/016513, Nov. 16, 2006.
Communication, App. No. 05 749 692.9-1525, Jun. 15, 2007.
Communication, App. No. 05 749 692.9-1525, Oct. 22, 2008.
Office Action, U.S. Appl. No. 11/154,749, Aug. 18, 2008.
Office Action, U.S. Appl. No. 11/154,749, Jan. 23, 2009.
International Search Report, PCT/US2005/021518, Jan. 3, 2006.
International Preliminary Report, PCT/US2005/021518, Jan. 4, 2007.
Communication, App. No. 05 762 201.1-2202, May 18, 2007.
Communication, App. No. 05 762 201.1-2202, Jul. 18, 2008.
Office Action, U.S. Appl. No. 11/269,378, Aug. 20, 2008.
Office Action, U.S. Appl. No. 11/269,378, Apr. 28, 2009.
International Search Report, PCT/US2005/040380, Mar. 15, 2006.
International Preliminary Report, PCT/US2005/040380, May 18, 2007.
Office Action, U.S. Appl. No. 11/277,896, Apr. 14, 2009.

International Search Report, PCT/US2006/012067, Aug. 9, 2006.
International Preliminary Report, PCT/US2006/012067, Oct. 11, 2007.
Communication, App. No. 06 740 274.3-2416, Jan. 31, 2008.
Communication, App. No. 06 740 274.3-2416, Sep. 17, 2008.
Notice of Intention to Grant, App. No. 06 740 274.3-2416, Mar. 20, 2009.

Y.F. Chen, et al., "Personalized Multimedia Services Using a Mobile Service Platform", IEEE 2002, pp. 918-215.
S. Gratschew, et al., "A Multimedia Messaging Platform for Content Delivering", IEEE 2003, pp. 431-435.
A. Ibenthal, et al.,"Multimedia im Fahrzeug: Dienste und Technik", Fernseh und Kino-Technik 54, Jahrgang Nr. Mar. 2000, pp. 100-105.

* cited by examiner

CONTENT PRESENTATION SYSTEM 500

CONTENT PRESENTATION SYSTEM 500

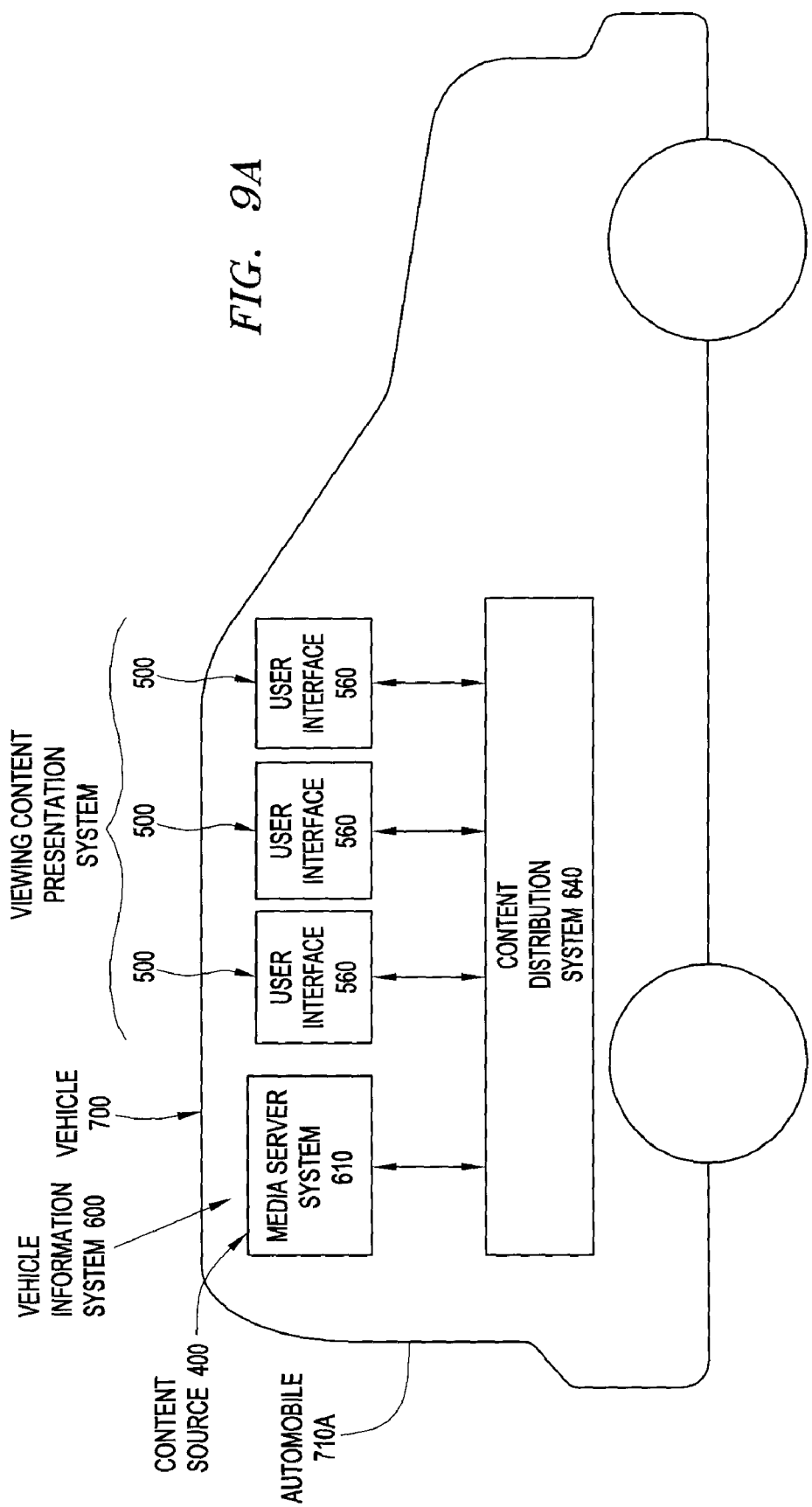

SYSTEM AND METHOD FOR PROVIDING SEARCHABLE DATA TRANSPORT STREAM ENCRYPTION

CROSS-REFERENCE TO RELATED APPLICATIONS

This application claims priority to a U.S. provisional patent application, Ser. No. 60/693,665, filed on Jun. 23, 2005. Priority to the provisional application is expressly claimed, and the disclosure of the provisional application is hereby incorporated herein by reference in its entirety.

FIELD

The present disclosure relates generally to data encryption and more particularly, but not exclusively, to the encryption of transport streams of viewing content for subsequent decryption and presentation via vehicle information systems installed aboard passenger vehicles.

BACKGROUND

Passenger vehicles, such as automobiles and aircraft, often provide vehicle information systems, such as passenger entertainment systems, to satisfy passenger demand for entertainment and other information content during travel.

Conventional vehicle information systems include content presentation systems for presenting viewing content to the passengers. These vehicle information systems typically include one or more media servers for storing the viewing content as well as video presentation systems, such as overhead cabin display systems and/or seatback display systems, and audio presentation systems, such as overhead speaker systems and/or individual headphones, for presenting the viewing content. The viewing content can include audio and video content that are derived from a variety of sources. Prerecorded viewing content, such as motion pictures and music, can be provided by internal content sources, such as audio and video players, that are installed aboard the vehicle. The conventional vehicle information systems likewise can include an antenna system for receiving viewing content, such as live television programming, transmitted from one or more external content providers (or sources) remote from the vehicle.

The content providers often employ a variety of security techniques to protect the viewing content from unauthorized access. If the viewing content includes Moving Picture Experts Group (MPEG) Transport Stream video content, for example, the content providers typically use conventional file-based encryption techniques to protect the viewing content. Such encryption techniques, however, suffer from many disadvantages. For example, the content providers currently require that viewing content be stored in an encrypted format at all times, even by the media servers and/or portable media devices associated with the vehicle information systems. The vehicle information systems therefore must perform additional processing, such as decryption and/or decoding, on the encrypted viewing content to allow the viewing content to be presented. This additional processing typically imposes restrictions on the encryption block size of the viewing content.

The presentation of the viewing content thereby is adversely affected. During fast-forward, rewind and search operations, for example, a decryption/decoding system must advance to an unknown position within the encrypted viewing content file and then begin to decrypt/decode the encrypted viewing content starting at that position. The visual presentation of the viewing content thereby can appear jumpy and otherwise discontinuous. Further, by requiring that the encryption of the viewing content be maintained even during media loading and other preparatory processes, the content providers prevent the viewing content from being pre-scanned to create an index or associated file to help ensure smooth presentation of the viewing content during fast-forward and rewind operations.

In view of the foregoing, a need exists for an improved system for encrypting data, such as viewing content, that overcomes the aforementioned obstacles and deficiencies of conventional file-based encryption techniques.

BRIEF DESCRIPTION OF THE DRAWINGS

FIG. 9A is a detail drawing illustrating another alternative embodiment of the content presentation system of FIG. 6, wherein a plurality of content presentation systems is incorporated within a vehicle information system that is installed aboard an automobile.

Figure 1:
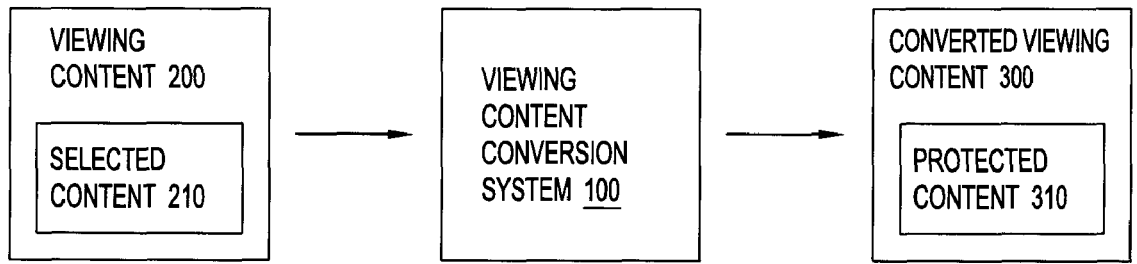
FIG. 1 is an exemplary top-level block diagram illustrating an embodiment of a viewing content conversion system for converting a predetermined portion of incoming viewing content into protected content for protection from unauthorized access.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not describe every aspect of the present disclosure and do not limit the scope of the disclosure.

DETAILED DESCRIPTION OF THE PREFERRED EMBODIMENTS

Since currently-available encryption techniques impose specific encryption block size restrictions on viewing content and impair presentation of the encrypted viewing content, a viewing content conversion system that protects viewing content while enabling smooth presentation of the protected viewing content can prove desirable and provide a basis for a wide range of data encryption applications, such as vehicle information systems installed aboard automobiles, aircraft, and other types of passenger vehicles. This result can be achieved, according to one embodiment disclosed herein, by a viewing content conversion system 100 for converting incoming viewing content 200 into converted viewing content 300 that is at least partially protected from unauthorized access as illustrated in FIG. 1.

Turning to FIG. 1, the content conversion system 100 is shown as receiving the incoming viewing content 200 that includes selected viewing content 210. The selected content 210 can comprise a predetermined portion of the viewing content 200 for which protection from unauthorized access is desirable. The content conversion system 100 converts the received viewing content 200 into the converted viewing content 300 as illustrated in FIG. 1. More specifically, the content conversion system 100 can provide the converted viewing content 300 with protected content 310. Being protected from unauthorized access, the protected viewing content 310 comprises the selected content 210 as converted by the content conversion system 100. The content conversion system 100 can provide the protected content 310 by converting the selected content 210 in any conventional manner. For example, the content conversion system 100 can apply conventional encryption techniques to the selected content 210 to provide the protected content 310.

The viewing content 200 that is not included with the selected content 210 can be referred to as remaining content 220 (shown in FIG. 2) of the viewing content 200. In other words, the remaining content 220 can comprise the unselected portion of the viewing content 200. The remaining portion 220, for example, can include supplemental data (not shown), such as information for handling the viewing content 200. The remaining portion 220 preferably includes presentation data (not shown) to help ensure that the viewing content 200 can be smoothly presented. As desired, the remaining content 220 can remain unprotected and can be combined with the protected content 310 to provide the converted viewing content 300. The converted viewing content 300 thereby can be at least partially protected against any unauthorized use, copying, and/or dissemination, and/or, even if intercepted or otherwise stolen, the converted viewing content 300 will not be readily usable.

The viewing content 200 can comprise any conventional type of audible and/or visible viewing content, such as stored (or time-delayed) viewing content and/or live (or real-time) viewing content, in the manner set forth in the co-pending U.S. patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," U.S. Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," U.S. Ser. No. 11/269,378, filed on Nov. 7, 2005, which are assigned to the assignee of the present application and the respective disclosures of which are hereby incorporated herein by reference in their entireties.

As desired, the viewing content 200 can include geographical information in the manner set forth in U.S. Pat. No. 6,661,353, entitled "METHOD FOR DISPLAYING INTERACTIVE FLIGHT MAP INFORMATION," which is assigned to the assignee of the present application and the disclosure of which is hereby incorporated herein by reference in its entirety. Alternatively, and/or in addition to entertainment content, such as live satellite television programming and/or live satellite radio programming, the viewing content 200 likewise can include two-way communications such as real-time access to the Internet 420 (shown in FIG. 9B) and/or telecommunications in the manner set forth in U.S. Pat. No. 5,568,484, entitled "TELECOMMUNICATIONS SYSTEM AND METHOD FOR USE ON COMMERCIAL AIRCRAFT AND OTHER VEHICLES," which is assigned to the assignee of the present application and the disclosure of which is hereby incorporated herein by reference in its entirety. It is understood that the exemplary viewing content 200 as shown and described herein are not exhaustive and are provided herein for purposes of illustration only and not for purposes of limitation.

Figure 2:
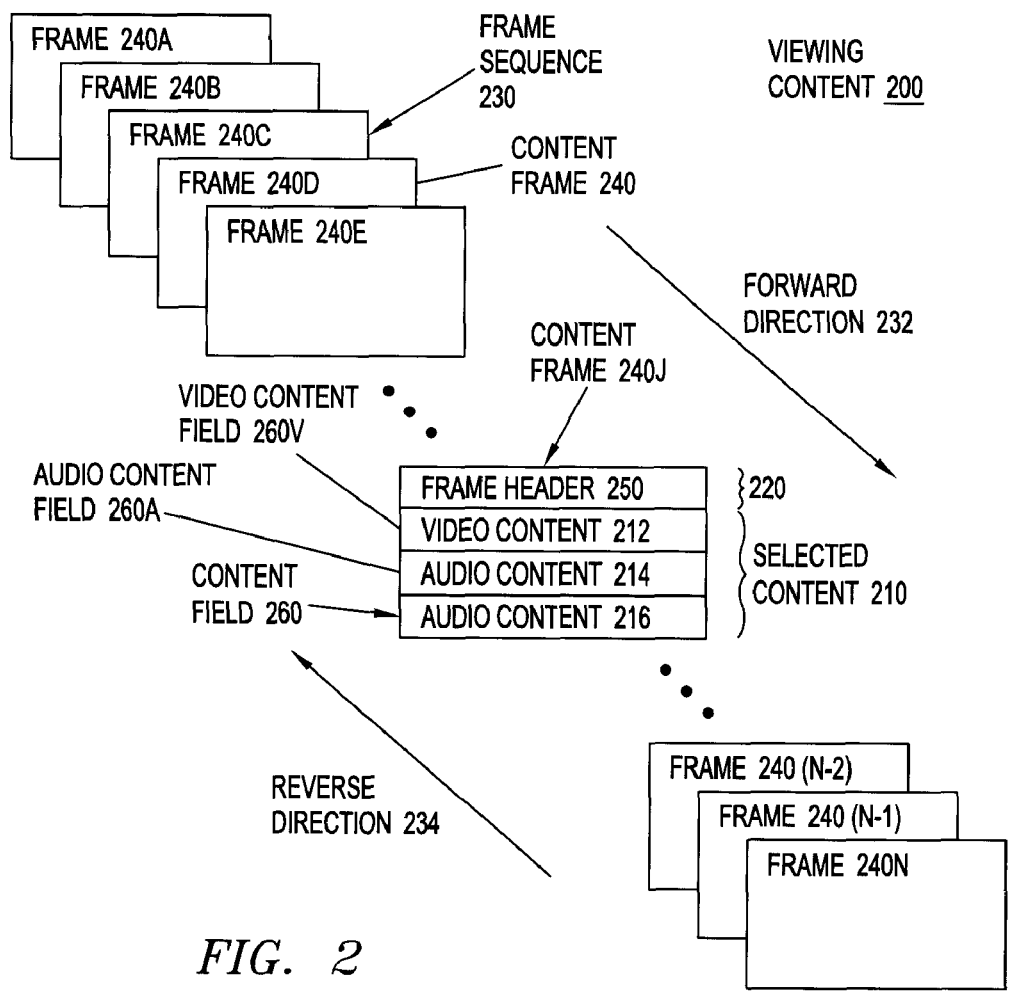
FIG. 2 is a detail drawing illustrating an embodiment of the viewing content of FIG. 1, wherein the viewing content is provided as an exemplary sequence of content frames.

FIG. 2 shows the viewing content 200 as a conventional frame (or packet) sequence 230 comprising a plurality of content frames (or packets) 240. The content frame 240 is the basic unit of content data in a typical transport stream. As illustrated in FIG. 2, the exemplary frame sequence 230 can comprise any predetermined number of the content frames 240A-N, and the content frames 240 can be presented in accordance with the frame sequence 230. The content frames 240A-N, for example, can be advanced in a forward direction 232 of the frame sequence 230, such as during playback and fast-forward operations. The frame sequence 230 of the content frames 240A-N likewise can be presented in a reverse direction 234, opposite the forward direction 232, during rewind operations. As desired, the forward direction 232 and the reverse direction 234 of the frame sequence 230 can be applied to the content frames 240A-N during search operations.

As illustrated by exemplary content frame 240J, each content frame 240 can include a frame (or packet) header 250. The frame header 250 can be provided as a conventional frame (or packet) header. Shown as being provided at the beginning of the content frame 240, the frame header 250 typically is stored and/or transmitted with the content frame 240 and can include supplemental data, such as information for the handling of the content frame 240. The frame header 250 preferably is provided with the remaining content 220 and can remain unprotected in the manner discussed above with reference to FIG. 1. The remaining content 220 can include other data and/or information, such as a frame size and/or a frame format, for each content frame 240, as desired.

Each content frame 240 likewise can have one or more content fields 260. As illustrated in FIG. 2, the exemplary content frame 240J can include at least one video content field 260V and/or at least one audio content field 260A, and the selected content 210 can include one or more of the content fields 260. Each video content field 260V comprises a conventional content field for storing and/or providing video content 212; whereas, audio content 214, 216 can be stored and/or provided by the respective conventional audio content fields 260A. Although the video content 212 stored in the content field 260V of the exemplary content frame 240J comprises visible image information, the video content 212 may or may not include a complete image. For example, depending upon the content format and/or encoding scheme applied to provide the viewing content 200, the video content 212 of the exemplary content frame 240J may depend upon one or more content frames 240 that precede and/or follow the exemplary content frame 240J in the frame sequence 230.

The video content 212 of a selected video content field 260V can be synchronized with the video content 212 of at least one other video content field 260V. Multiple images thereby may be simultaneously presented in any conventional manner. For example, the multiple images can be presented in the form of a picture-in-picture (PiP) format and/or a picture-outside-picture (PoP) format in the manner set forth in the co-pending U.S. patent application, entitled "SYSTEM AND METHOD FOR PRESENTING HIGH-QUALITY VIDEO," Ser. No. 11/379,360, filed on Apr. 19, 2006, which is assigned to the assignee of the present application and the disclosure of which is hereby incorporated herein by reference in its entirety. As desired, one or more of the other video content fields 260V likewise can include textual content, such as closed-captioning content and/or subtitle content, for presentation with the video content 212 of the selected video content field 260V.

Similarly, the video content 212 of each video content field 260V preferably is synchronized with the audio content 214, 216 of at least one of the audio content fields 260A for simultaneous playback. The audio content 214, 216 thereby can comprise a conventional soundtrack for the video content 212. For example, audio content 214, 216 of a pair of selected audio content fields 260A can be played back together to provide a stereo soundtrack for the video content 212. The soundtrack for the video content 212 likewise can be provided in a plurality of different languages and/or language dialects via a plurality of selected audio content fields 260A. Thereby, the video content 212 can be simultaneously presented with a soundtrack in a suitable language and/or language dialect by selecting the one or more audio content fields 260A with the suitable the audio content 214, 216. A musical score for the video content 212, as desired, can be stored and/or transmitted as the audio content 214, 216 from a selected audio content field 260A.

Alternatively, and/or in addition, the content frames 240 of the viewing content 200 can include one or more miscellaneous content fields (not shown). Exemplary miscellaneous content fields can include closed-captioning data fields, private data fields, and/or proprietary data fields. In the manner discussed above, each miscellaneous content field can be synchronized with the video content 212 and/or the audio content 214, 216. The miscellaneous content fields likewise can be included with the selected content 210 and/or the remaining content 220, as desired.

In the manner set forth in the above-mentioned co-pending U.S. patent applications, "SYSTEM AND METHOD FOR DOWNLOADING FILES," Ser. No. 10/772,565, filed on Feb. 4, 2004; and "PORTABLE MEDIA DEVICE AND METHOD FOR PRESENTING VIEWING CONTENT DURING TRAVEL," U.S. Ser. No. 11/154,749, filed on Jun. 15, 2005, the viewing content 200 can be provided, stored, and/or transmitted in any conventional manner. For example, the viewing content 200 can include streamed viewing content and/or a viewing content file of any kind. The viewing content 200 likewise can be provided in any conventional analog and/or digital format. Illustrative formats for the video content 212 of the viewing content 200 can include any Audio Video Interleave (AVI) format, Joint Photographic Experts Group (JPEG) format, and/or Moving Picture Experts Group (MPEG) format; whereas, any Waveform (WAV) format and/or MPEG Audio Layer 3 (MP3) format comprise exemplary formats for the audio content 214, 216. Although the viewing content 200 may be provided in any uncompressed format, the viewing content 200 likewise can be provided in a compressed format to facilitate data storage and/or transmission. To help ensure smooth presentation, the viewing content 200 preferably is buffered during transmission and/or presentation.

Figure 3A:
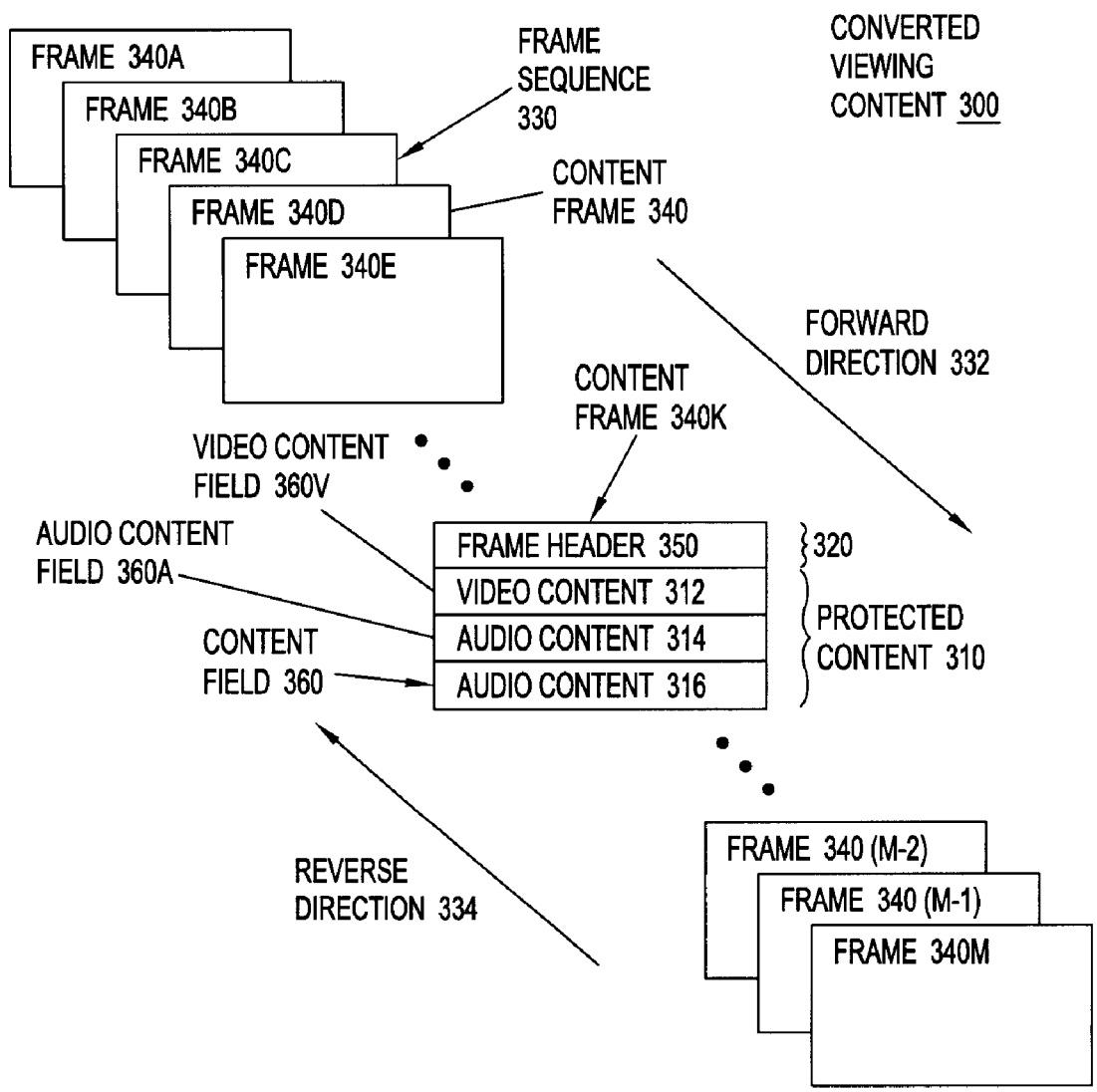
FIG. 3A is a detail drawing illustrating an embodiment of the converted viewing content of FIG. 1, wherein the converted viewing content is provided as an exemplary sequence of content frames.

Comprising the viewing content 200 as converted by the viewing content conversion system 100 (shown in FIG. 1), the converted viewing content 300 likewise can include any conventional type of audible and/or visible viewing content in the manner discussed above with reference to the viewing content 200 (shown in FIG. 2). As illustrated in FIG. 3A, for example, the converted viewing content 300 therefore can be provided as a conventional frame (or packet) sequence 330 in the manner set forth above. The frame sequence 330 is shown as comprising a plurality of converted content frames (or packets) 340. The exemplary frame sequence 330 can include any predetermined number of the converted content frames 340A-M, and the converted content frames 340 can be presented in accordance with the frame sequence 330 in a forward direction 332 and/or a reverse direction 334, opposite the forward direction 332, as discussed above.

Each converted content frame 340 can include a frame (or packet) header 350 as illustrated by exemplary converted content frame 340K. Being provided in the manner discussed above with reference the frame header 250 (shown in FIG. 2), the frame header 350 typically is stored and/or transmitted with the content frame 340 and can include supplemental data, such as information for the handling of the content frame 340. The frame header 350 preferably comprises unprotected content 320. The unprotected content 320 is content stored in the converted content frame 340 that is not protected in the manner discussed above with reference to FIG. 1 and, as desired, can include other data and/or information, such as a frame size and/or a frame format, for each content frame 340. Being provided as conventional frame (or packet) headers, the frame headers 350 can comprise and/or differ from the frame headers 250 (shown in FIG. 2) for the viewing content 200 an is shown as being provided at the beginning of the content frame 340.

Each content frame 340 can have one or more converted content fields 360 in the manner discussed above with reference the frame header 250. As shown in FIG. 3A, the exemplary content frame 340K can include at least one converted video content field 360V and/or at least one converted audio content field 360A. Each video content field 360V comprises a conventional content field for storing and/or providing video content 312; whereas, audio content 314, 316 can be stored and/or provided by the respective conventional audio content fields 360A. For example, the converted video content 312 in a selected video content field 360V can include the video content 212 (shown in FIG. 2) from a selected video content field 260V as converted by the viewing content conversion system 100 (shown in FIG. 1). The viewing content conversion system 100 likewise can convert the audio content 214, 216 (shown in FIG. 2) from a selected audio content field 260A to provide the converted audio content 314, 316 in a selected audio content field 360A. As desired, one or more additional video content fields 360V and/or audio content fields 360A can be created and added to, and/or included with, the content fields 360 of the content frames 340.

For each converted content frame 340, the converted content 312, 314, 316 in the selected content field 360 may be associated with the content 212, 214, 206 from one or more selected content fields 260 from at least one content frame 240 (shown in FIG. 2). The content 212, 214, 206 from a selected content field 260 from each content frame 240 likewise can be associated with the converted content 312, 314, 316 in one or more selected content fields 360 of at least one converted content frame 340. For example, although the converted video content 312 stored in the content field 360V of the exemplary content frame 340K comprises visible image information, the video content 312 may or may not include a complete image. For example, depending upon the content format and/or encoding scheme applied to provide the converted viewing content 300, the video content 312 of the exemplary content frame 340K may depend upon one or more content frames 340 that precede and/or follow the exemplary content frame 340K in the frame sequence 330.

One or more of the converted content fields 360 of the content frame 340 can comprise the protected content 310. In the manner discussed in more detail above with reference to the video content 212 (shown in FIG. 2), the video content 312 of a selected video content field 360V can be synchronized with the video content 312 of at least one other video content field 360V and preferably is synchronized with the audio content 314, 316 of at least one of the audio content fields 360A for simultaneous playback. Alternatively, and/or in addition, the content frames 340 of the converted viewing content 300 can include one or more miscellaneous content fields (not shown). Exemplary miscellaneous content fields can include closed-captioning data fields, private data fields, and/or proprietary data fields. In the manner discussed above, each miscellaneous content field can be synchronized with the video content 312 and/or the audio content 314, 316. The miscellaneous content fields likewise can be included with the protected content 310 and/or the unprotected content 320, as desired.

In the manner set forth above, the converted viewing content 300 can be provided, stored, and/or transmitted in any conventional manner. For example, the converted viewing content 300 can include streamed viewing content and/or a viewing content file of any kind. The converted viewing content 300 likewise can be provided in any conventional analog and/or digital format. Although the converted viewing content 300 may be provided in any uncompressed format, the converted viewing content 300 likewise can be provided in a compressed format to facilitate data storage and/or transmission. To help ensure smooth presentation, the converted viewing content 300 preferably is buffered during transmission and/or presentation.

Figure 3B:
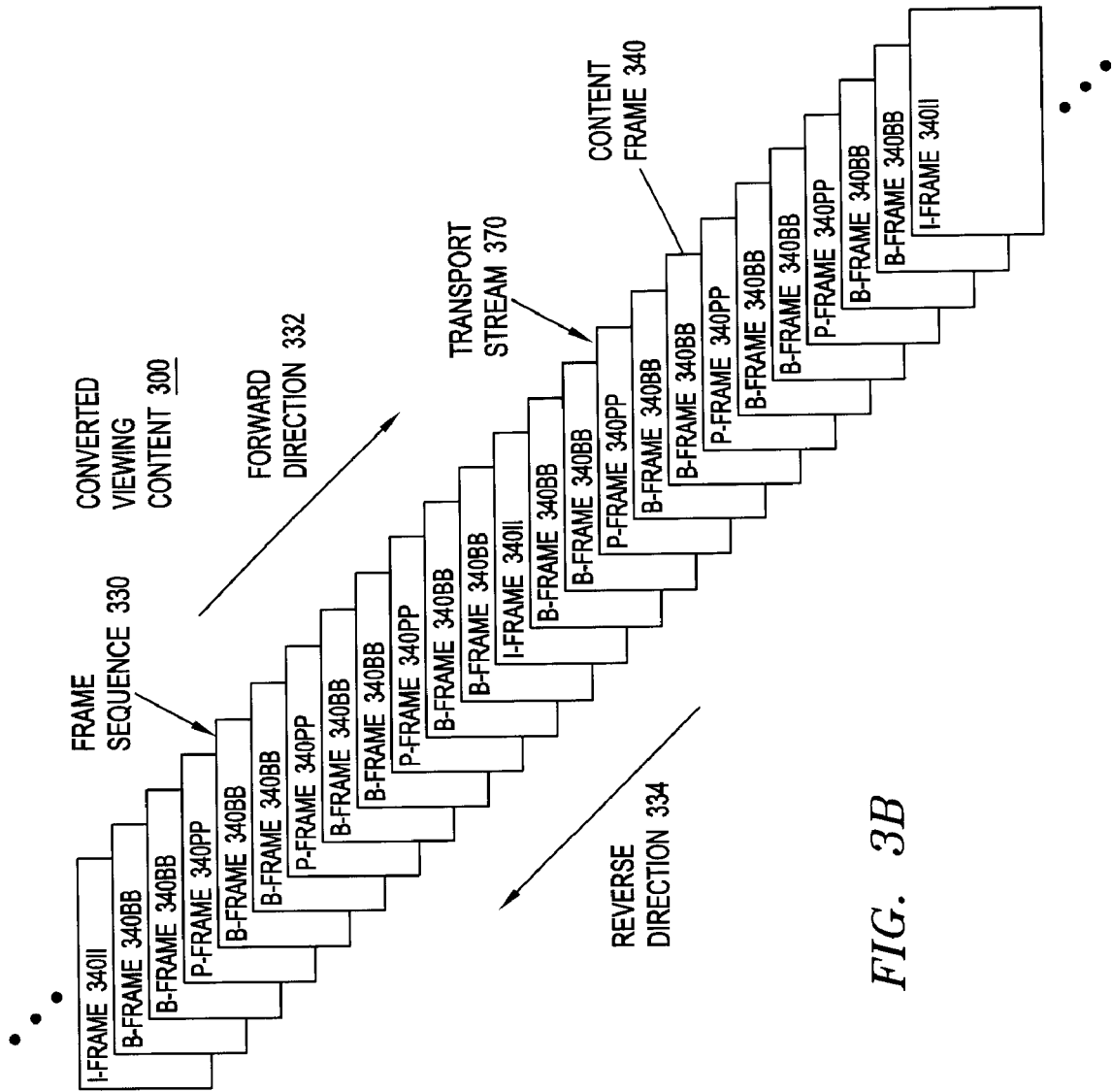
FIG. 3B is a detail drawing illustrating an alternative embodiment of the converted viewing content of FIG. 3A, wherein the converted viewing content includes an exemplary transport stream comprising a plurality of Moving Picture Experts Group (MPEG) content frames.

For purposes of illustration only, the converted viewing content 300 is shown in FIG. 3B as comprising a conventional transport stream 370 in a Moving Picture Experts Group (MPEG) format. Exemplary Moving Picture Experts Group formats can include a Moving Picture Experts Group 1 (MPEG-1) format and/or a Moving Picture Experts Group 2 (MPEG-2) format as specified in the International Organization for Standardization (ISO) and the International Electrotechnical Commission (IEC) Standard 13818-1. In the manner discussed in more detail above with reference to the frame sequence 230 of FIG. 2, the converted viewing content 300 can comprise a plurality of content frames (or packets) 340 that can be presented in a forward direction 332 and/or a reverse direction 334 in accordance with a predetermined frame sequence 330. When presented in accordance with the frame sequence 330, the converted viewing content 300 can be provided as the transport stream 370.

Figure 5:
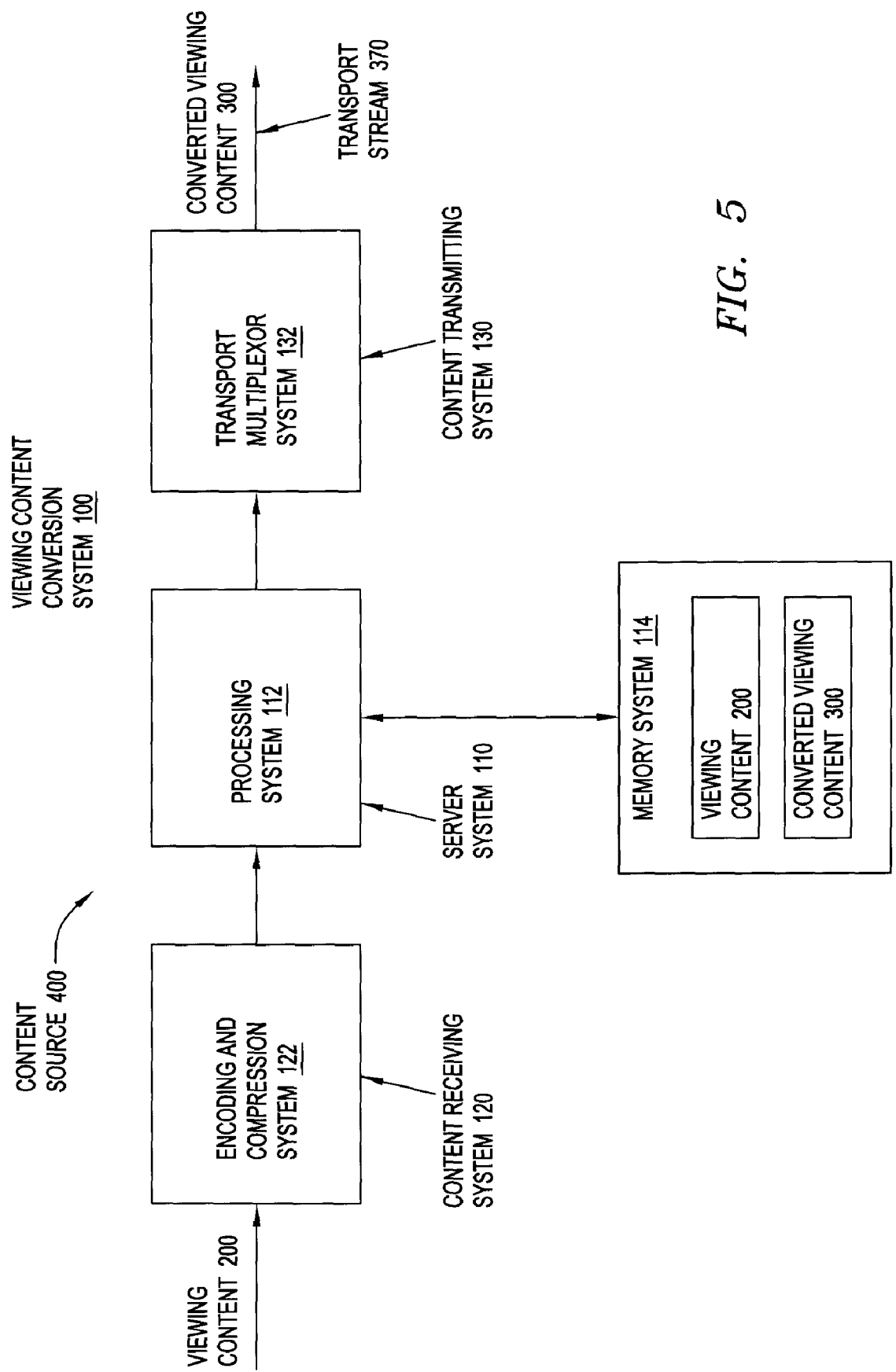
FIG. 5 is a detail drawing illustrating an exemplary embodiment of the viewing content conversion system of FIG. 1, wherein the viewing content conversion system is provided as a conventional server system (or workstation).

As desired, the converted viewing content 300 likewise can be provided as encoded video content in a Moving Picture Experts Group 4 (MPEG-4) format if the converted viewing content 300 is stored in a memory system, such as the memory system 114 (shown in FIG. 5). The viewing content conversion system 100 (shown in FIG. 1) can prepare the converted viewing content 300 for transmission by transforming the viewing content into constant bit rate media, except perhaps media that can be stored in an unencrypted format. Although the transport stream 200 preferably is provided in a Moving Picture Experts Group (MPEG) format for backward compatibility, it will be appreciated that Moving Picture Experts Group (MPEG) transport streams are not required, for example, when the video content is transmitted over an internet protocol (IP). As desired, the converted viewing content 300 can be transmitted as MPEG-1 and/or MPEG-2 elementary streams 372 over a Realtime Transport Protocol (RTP).

The transport stream 370 can be formed from one or more (packetized) elemental streams 372 (shown in FIG. 6), such as at least one elemental stream 372 of video content 312 and/or at least one elemental stream 372 of audio content 314, 316. In other words, the elemental stream 372 of video content 312 can be referred to as being an elemental video stream 372V (shown in FIG. 6); whereas, the elemental audio streams 372A (shown in FIG. 6) can include the elemental streams 372 of audio content 314, 316. The MPEG standard specifies the syntax of the elemental streams of the video content 312 and/or audio content 314, 316. For example, the elemental video stream 372V and the elemental audio streams 372A can be multiplexed and synchronized in the manner set forth above, and the video content 312 and/or the audio content 314, 316 can be encoded, as desired. The elemental video stream 372V and the elemental audio streams 372A thereby can be combined to form the transport stream 370.

When the conventional transport stream 370 is provided in the Moving Picture Experts Group (MPEG) format, the video content 312 can be encoded in a plurality of different types of content frames 340. As illustrated in FIG. 3B, for example, the content frames 340 can include any conventional types of the content frames 340, such as Intra-Coded Image Frames (or I-frames) 340II, Predictive-Coded Frames (or P-frames) 340PP, and/or Bi-Directionally Predictive-Coded Frames (or B-frames) 340BB. The I-frames 340II typically comprise self-contained content frames 340, which are encoded as a single image and without reference to any other preceding and/or following content frames 340. Since the I-frames 340II are encoded as a single image, the I-frames 340II include the most information and have the largest frame size.

Conventional P-frames 340PP, in contrast, are encoded relative to the closest preceding reference frame, such as a selected I-frame 340II and/or another P-frame 340PP. Similarly, the B-frames 340BB rely on other content frames 340 and can be encoded relative to the preceding reference frame and/or the following reference frame. In the manner discussed with reference to the P-frames 340PP, the preceding reference frame and the following reference frame for each B-frame 340BB can be a selected I-frame 340II and/or another P-frame 340PP. Although shown and described as comprising a typical arrangement of the I-frames 340II, the P-frames 340PP, and the B-frames 340BB with reference to FIG. 3B for purposes of illustration only, the transport stream 370 can comprise any suitable arrangement of any predetermined number of different types of the content frames 340. The transport stream 370, for example, can include intraframe-encoded DC-Coded Image Frames (or D-Frames) (not shown) for facilitating fast forward and/or fast rewind operations.

Figure 4A:
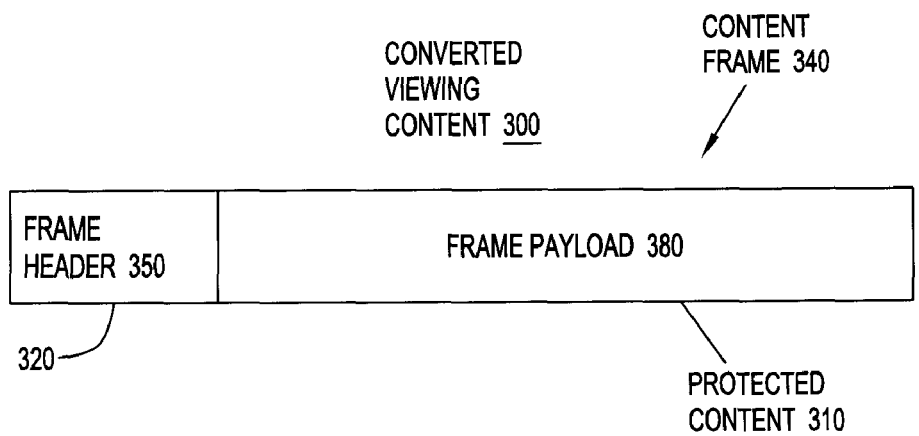
FIG. 4A is a detail drawing illustrating an embodiment of an exemplary content frame for the converted viewing content of FIGS. 3A-B, wherein the content frame comprises a frame header and a frame payload.

Exemplary content frames 340 for the transport stream 370 are shown and described with reference to FIGS. 4A-C. Each content frame 340 can have any preselected frame length, which typically is approximately one hundred, eighty-eight bytes when the conventional transport stream 370 is provided in the Moving Picture Experts Group (MPEG) format. Turning to FIG. 4A, for example, the content frame 340 is shown as including a frame header 350 and a frame payload 380. The frame header 350 can be provided in the manner discussed above with reference to FIG. 3A, and the frame payload 380 follows the frame header 350 in the content frame 340 and comprises the remaining bytes of the content frame 340. In the manner set forth in more detail above with reference to the exemplary sequence 330 of the content frames 340 of FIG. 3A, at least a portion of the frame payload 380 can be designated as being the protected content 310; whereas, the frame header 350 preferably is provided with the unprotected content 320 and remains unprotected.

The frame header 350 of the content frames 340 can comprise a conventional Moving Picture Experts Group (MPEG) frame header and can include any suitable number of bit fields (not shown). Each content frame 340 has a header length having a predetermined number of information bits, and the header length preferably is substantially uniform among the content frames 340 forming the transport stream 370. Exemplary bit fields can include a packet identifier (PID) field, a transport scrambling control field, a payload unit start indicator field, a transport priority field, an adaptation field control field, a synchronization field, a transport error indicator field, and/or a continuity counter field. The exemplary bit fields are not exhaustive and are provided herein for purposes of illustration only and not for purposes of limitation.

The packet identifier field, for example, typically indicates the type of content associated with the frame payload 380. Since only the protected content 310 is protected, such as via encryption, the packet identifier field can indicate whether the media is protected. The transport scrambling control field can be applied to indicate the scrambling mode of the frame payload 380; whereas, the payload unit start indicator field is a one-field that applies to frame payloads 380 with Packetized Elementary Stream (PES) headers 382 (shown in FIGS. 4B-C). When the payload unit start indicator field is set, the transport priority field indicates whether the associated frame payload 380 will commence with the first byte of the Packetized Elementary Stream header 382.

Advantageously, the use of the bit fields can enable the viewing content conversion system 100 (shown in FIG. 1) to extract the I-frames 340II (shown in FIG. 3B) of the transport stream 370 (shown in FIG. 3B) without decrypting the protected content 310. For example, since elementary stream packets typically are much larger than transport stream packets, a first selected bit field, such as the payload unit start indicator field can be applied to indicate whether the associated content frame 340 includes the Packetized Elementary Stream header 382 and/or a second selected bit field, such as the transport priority field can be applied to indicate whether the associated content frame 340 is an I-frame 340II, a B-frame 340BB (shown in FIG. 3B), and/or a P-frame 340PP (shown in FIG. 3B). If the transport priority field comprises one-bit bit field, the transport priority field can be set to a first predetermined value, such as a high logic level (or "1"), to indicate that the content frame 340 is an I-frame 340II and to a second predetermined value, such as a low logic level (or "0"), to indicate that the content frame 340 is a B-frame 340BB or a P-frame 340PP.

If the content frame 340 can further include a conventional adaptation field 390 (shown in FIG. 4C) for providing packet timing information, the adaptation field control field can be applied to indicate whether the content frame 340 comprises the frame payload 380 and/or the adaptation field 390. Since the frame length and the header length typically remain uniform among the content frames 340, the total number of bits remaining in each content frame 340 for providing the frame payload 380 and the adaptation field 390 likewise is substantially fixed. The number of bits available for storing the frame payload 380 therefore is reduced as the number of bits reserved for the adaptation field 390 increases. The adaptation field 390 preferably is included with the frame header 350 in the unprotected content 320 and remains unprotected. Although specific packet fields are shown and described with reference to FIGS. 4A-C for purposes of illustration, it is understood that the content frame 340 can comprise any suitable number and/or type of conventional packet fields as desired.

Figure 4B:
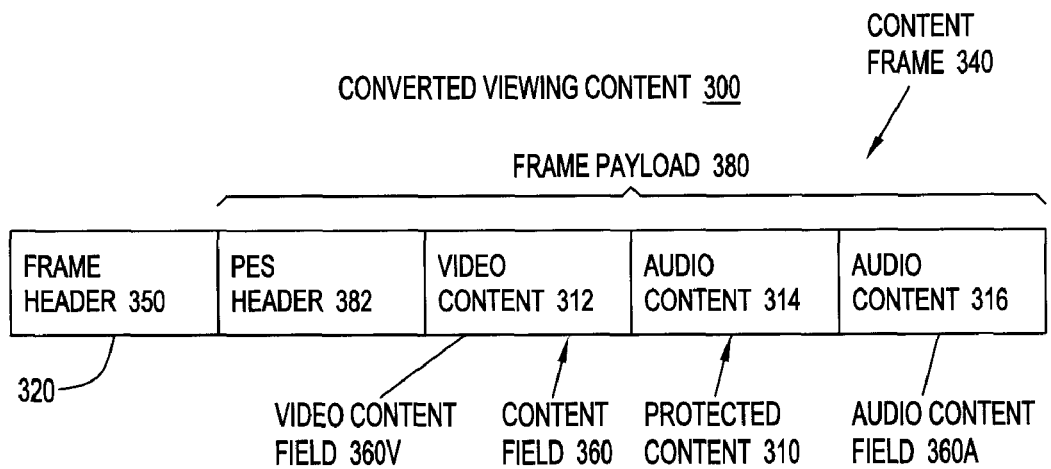
FIG. 4B is a detail drawing illustrating an alternative embodiment of the exemplary content frame of FIG. 4A, wherein the frame payload comprises the protected content.
Figure 4C:
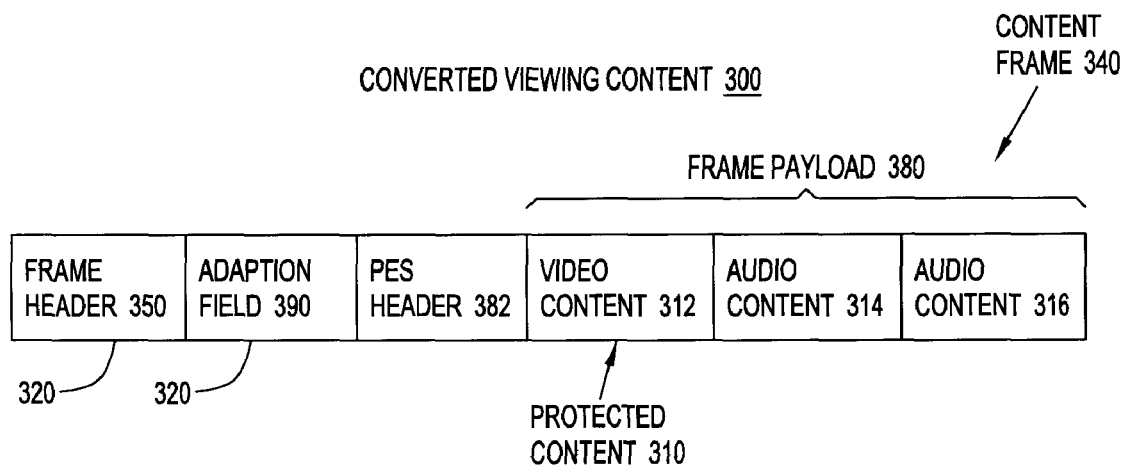
FIG. 4C is a detail drawing illustrating another alternative embodiment of the exemplary content frame of FIG. 4A, wherein the content frame further comprises an adaptation field.

Turning to FIG. 4B, the frame payload 380 of the illustrated content frame 340 is shown as comprising one or more content fields 360. In the manner set forth in more detail above with reference to the exemplary content frame 340K of FIG. 3A, the content fields 360 can include at least one video content field 360V and/or at least one audio content field 360A. One or more of the content fields 360 can be designated for protection as the protected content 310. As desired, the Packetized Elementary Stream header 382 can be designated for protection as the protected content 310 as shown in FIG. 4B and/or can be included with the unprotected content 320 as illustrated in FIG. 4C. When the content frames 340 are provided in accordance with the frame sequence 330 (shown in FIG. 3B), the transport stream 370 (shown in FIG. 3B) can include one or more elemental streams 372 (shown in FIG. 6) of the protected content 310. Stated somewhat differently, the viewing content conversion system 100 (shown in FIG. 1) advantageously protects only the frame (or transport stream) payload 380 of the transport stream 270. The converted viewing content 300 thereby can be at least partially protected against any unauthorized use, copying, and/or dissemination, and/or, even if intercepted or otherwise stolen, the converted viewing content 300 will not be readily usable.

The viewing content conversion system 100 can convert the selected content 210 of the viewing content 200 into the protected content 310 of the converted viewing content 300 in any conventional manner, such as via encryption. The selected content 210 can be encrypted using any conventional encryption technique, including the use of proprietary encryption techniques, and preferably is encrypted using an Advanced Encryption Standard (AES) such as 128-bit private key encryption with any suitable arrangement of configuration parameters. In accordance with World Airline Entertainment Association (WAEA) Specification No. 403, each media file can be associated with a unique key, which preferably is the same key that is created by the media source when the media file was created. To further reduce cost and/or administrative overhead, the key distribution mechanism can inhibit distribution and/or use of device-specific keys to simply key loading at the factory. The key distribution mechanism likewise can include a security integrated circuit for securely storing keys on the system and/or does not require external Key Management Authority (KMA) functionality.

As desired, the encryption technique for the viewing content 200 can include a Cipher Block Chaining (CBC) Mode that starts from the first byte of the transport stream payload 380 with an initial value (IV) for the CBC encrypted block that can be equal to a preselected value, such as a low logic level (or "0"). The initial value (IV) for the CBC encrypted block can be distributed in any conventional manner, such as along with the key value. In Cipher Feedback (CFB) mode, the encryption technique likewise can include any remainder of the transport stream payload 380 less than a block size of approximately one hundred, eighty-eight bytes and/or an initial value (IV), which can comprise an output from the previous CBC encrypted block. Advantageously, by limiting the length of the CBC chain to each one hundred, eighty-eight byte transport stream packet 340, each transport stream packet 340 can be viewed and decrypted without having decrypted any prior part of the transport stream 370. Thereby, independent jump operations, such as fast-forward operations and/or rewind operations, and searches for I-frames 340II (shown in FIG. 3B) using information from the transport stream header can be supported. The I-frame search therefore can be used to provide smoother jump functionality.

All licensed viewing content 200 and other data, which typically is supplied in an encrypted format, can thereby remain in an encrypted format when static (such as stored within a memory system) and/or during transmission. The viewing content conversion system 100 thereby can increase data security, can simplify steps involving data storage and transfer, and/or can preserve a predetermined bandwidth load allowance when selected functions, such as fast-forward operations and/or rewind operations, are performed. Further, if encryption of the transport stream payload 380 is adopted as a standard practice, the need to decrypt and re-encrypt data, such as viewing content 200, prior to transmission and/or storage can be avoided. Potential savings therefore can include significant time savings for each minute of streamed viewing content multiplied by an amount of viewing content 200 processed by the viewing content conversion system 100.

Although the viewing content conversion system 100 can be provided in any conventional manner, the viewing content conversion system 100 is shown in FIG. 5 as comprising a computer server (or workstation) system 110. The server system 110 can be provided in any conventional manner such as in the manner set forth in the co-pending U.S. patent applications, entitled "SYSTEM AND METHOD FOR IMPROVING NETWORK RELIABILITY," Ser. No. 10/773,523, filed on Feb. 6, 2004; and entitled "SYSTEM AND METHOD FOR IMPROVING NETWORK RELIABILITY," U.S. Ser. No. 11/086,510, filed on Mar. 21, 2005. The server system 110 can receive the viewing content 200 and convert the received viewing content 200 into the converted viewing content 300 in the manner set forth in more detail above. Thereby, the server system 110 can provide the transport stream 370 with the transport stream payload 380 (shown in FIGS. 4B-C).

As shown in FIG. 5, the server system 110 can include a processing system 112 for receiving and processing the viewing content 200 and a memory system 114 for storing and providing the converted viewing content 300. Being provided in the manner set forth in the above-referenced co-pending U.S. patent applications, "SYSTEM AND METHOD FOR DOWNLOADING FILES," Ser. No. 10/772,565, filed on Feb. 4, 2004; and "PORTABLE MEDIA DEVICE AND METHOD FOR PRESENTING VIEWING CONTENT DURING TRAVEL," U.S. Ser. No. 11/154,749, filed on Jun. 15, 2005, the processing system 112 can comprise any appropriate number and type of conventional processing systems; whereas, the memory system 114 can be coupled with the processing system 112 and can include any conventional type of memory system for storing and providing other conventional types of information, including instruction code, such as software or firmware, intermediate calculation results, and other information associated with the processing system 112. As desired, the memory system 114 can provide at least temporary storage of the viewing content 200 as illustrated in FIG. 5.

The server system 110 likewise may be coupled with a content receiving system 120 for receiving the viewing content 200 and/or a content transmitting system 130 for providing the transport stream 370. As desired, the server system 110, the content receiving system 120, and the content transmitting system 130 can comprise separate systems as illustrated in FIG. 5, and/or the content receiving system 120 and/or the content transmitting system 130 can be at least partially integrated with the server system 110. If the transport stream 370 is provided in the Moving Picture Experts Group (MPEG) format, for example, the content receiving system 120 can include a conventional encoding and compression system 122. The content receiving system 120 thereby can encode and compress the viewing content 200 into a suitable MPEG format for further processing and/or storage as the converted viewing content 300. The content transmitting system 130 can receive the one or more elemental streams 372 (shown in FIG. 6) of the converted viewing content 300 from the server system 110. Illustrated as being provided as a conventional transport multiplexer system 132, the content transmitting system 130 can multiplex the elemental streams 372 to form the transport stream 370.

As shown in FIG. 5, the viewing content conversion system 100 can be associated with a selected content source 400. The content source 400 can be provided in the manner set forth in the above-referenced co-pending U.S. patent applications, "SYSTEM AND METHOD FOR DOWNLOADING FILES," Ser. No. 10/772,565, filed on Feb. 4, 2004; and "PORTABLE MEDIA DEVICE AND METHOD FOR PRESENTING VIEWING CONTENT DURING TRAVEL," U.S. Ser. No. 11/154,749, filed on Jun. 15, 2005, as well as in the co-pending U.S. patent applications, entitled "SYSTEM AND METHOD FOR MANAGING CONTENT ON MOBILE PLATFORMS," Ser. No. 11/123,327, filed on May 6, 2005; and entitled "SYSTEM AND METHOD FOR RECEIVING BROADCAST CONTENT ON A MOBILE PLATFORM DURING INTERNATIONAL TRAVEL," U.S. Ser. No. 11/269,378, filed on Nov. 7, 2005, which are assigned to the assignee of the present application and the respective disclosures of which are hereby incorporated herein by reference in their entireties. The viewing content conversion system 100 likewise can receive the viewing content 200 from, and/or provide the transport stream 370 of the converted viewing content 300 to, another content source (not shown). In other words, the selected content source 400 can be configured to operate as an intermediate (or relay) system in a larger communication system that includes one or more other content sources.

Figure 6:
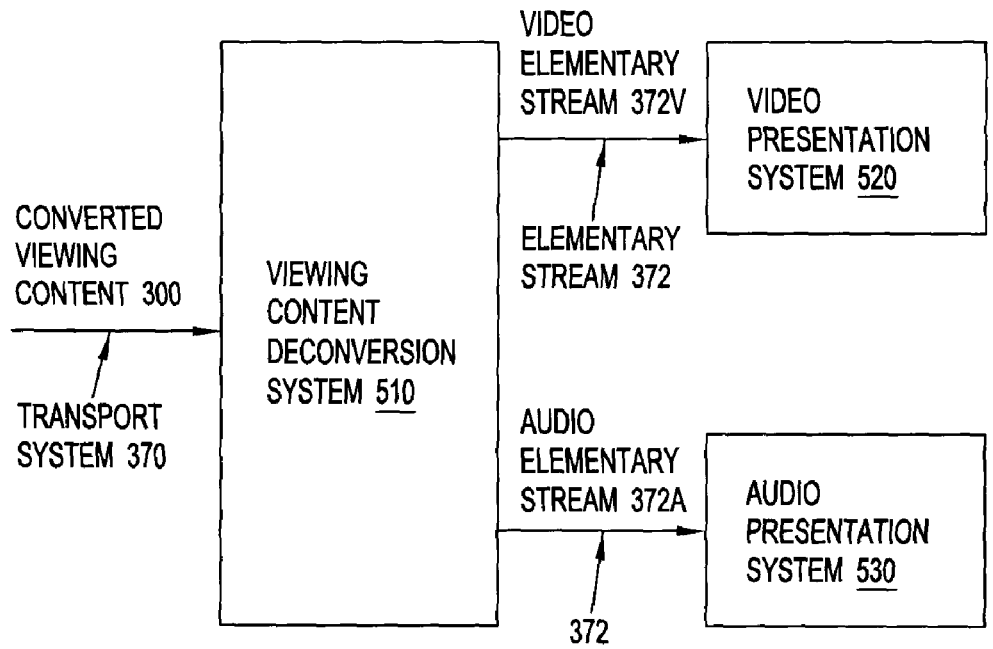
FIG. 6 is an exemplary top-level block diagram illustrating an embodiment of a content presentation system for presenting the protected content provided by the viewing content conversion system of FIG. 1.

FIG. 6 shows an exemplary viewing content presentation system 500 for receiving the transport stream 370 the transport stream 370 and for deconverting the received transport stream 370 into one or more elemental streams 372 for presentation. Being provided in any conventional manner, the content presentation system 500 is illustrated as including a viewing content deconversion system 510 that can receive the transport stream 370 and that can recover the elemental streams 372 from the received transport stream 370. The viewing content deconversion system 510 therefore can substantially reverse the conversion of the viewing content 200 (shown in FIG. 1) into the converted viewing content 300, removing the protection from the protected content 310 (shown in FIG. 1) such that the protected content 310 can be presented. In other words, if the transport stream 370 is provided with the encrypted transport stream payload 380 (shown in FIGS. 4B-C), for example, the viewing content deconversion system 510 can decrypt the transport stream 370 and can provide the decrypted elemental streams 372 for distribution.

In the manner discussed above with reference to FIG. 3A, the elemental streams 372 can include at least one elemental video stream 372V and/or at least one elemental audio stream 372A. The viewing content presentation system 500 of FIG. 6 likewise is shown in FIG. 6 as including a video presentation system 520 for visually presenting the elemental video stream 372V and an audio presentation system 530 for audibly presenting the elemental audio stream 372A. The video presentation system 520 and the audio presentation system 530 each can be provided in any conventional manner. For example, the video presentation system 520 and the audio presentation system 530 can be provided in the manner set forth in the above-referenced co-pending U.S. patent applications, "SYSTEM AND METHOD FOR DOWNLOADING FILES," Ser. No. 10/772,565, filed on Feb. 4, 2004; "PORTABLE MEDIA DEVICE AND METHOD FOR PRESENTING VIEWING CONTENT DURING TRAVEL," U.S. Ser. No. 11/154,749, filed on Jun. 15, 2005; "SYSTEM AND METHOD FOR RECEIVING BROADCAST CONTENT ON A MOBILE PLATFORM DURING INTERNATIONAL TRAVEL," U.S. Ser. No. 11/269,378, filed on Nov. 7, 2005; and "SYSTEM AND METHOD FOR PRESENTING HIGH-QUALITY VIDEO," U.S. Ser. No. 11/379,360, filed on Apr. 19, 2006.

Figure 7:
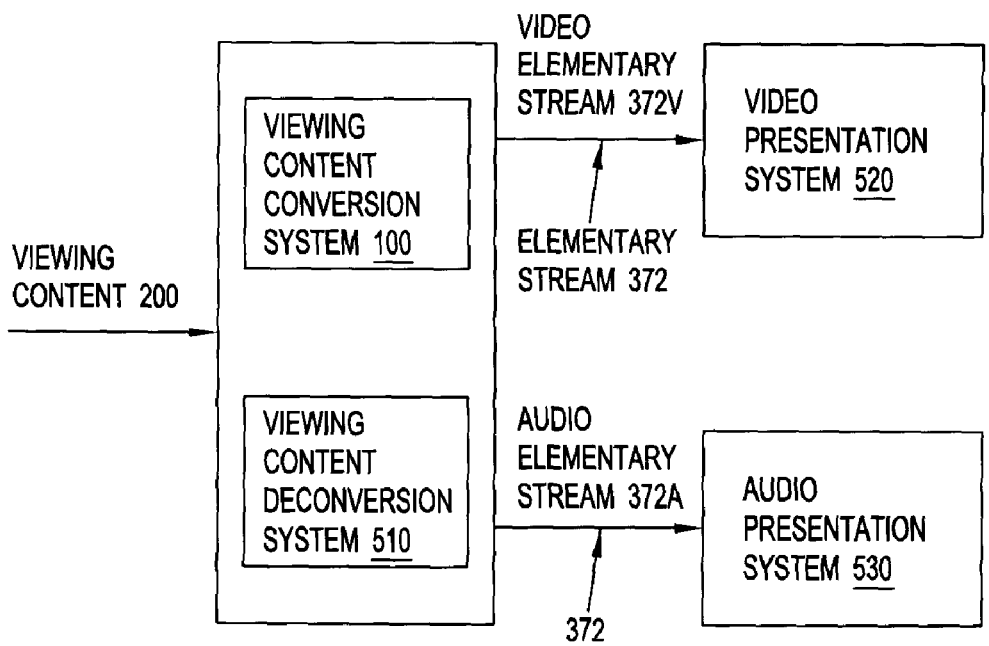
FIG. 7 is an exemplary top-level block diagram illustrating an alternative embodiment of the content presentation system of FIG. 6, wherein the viewing content conversion system of FIG. 1 is incorporated into the content presentation system.

As illustrated in FIG. 7, the viewing content conversion system 100 can be incorporated with the viewing content presentation system 500. Thereby, the viewing content presentation system 500 can be advantageously configured to receive the viewing content 200 and to convert the received viewing content 200 into the converted viewing content 300 (shown in FIG. 1) for local storage and/or presentation in the manner set forth in more detail above. By incorporating the viewing content conversion system 100, the viewing content presentation system 500 can directly receive the viewing content 200 and can provide protection for the selected content 210 (shown in FIG. 1) of the viewing content 200. The viewing content presentation system 500 thereby can locally store the transport stream 370 with the protected transport stream payload 380 (shown in FIGS. 4B-C) and/or distribute the elemental streams 372 to the local video presentation system 520 and/or the audio presentation system 530. The converted viewing content 300 thereby can be at least partially protected against any unauthorized use, copying, and/or dissemination, and/or, even if intercepted or otherwise stolen, the converted viewing content 300 will not be readily usable.

Figure 8:
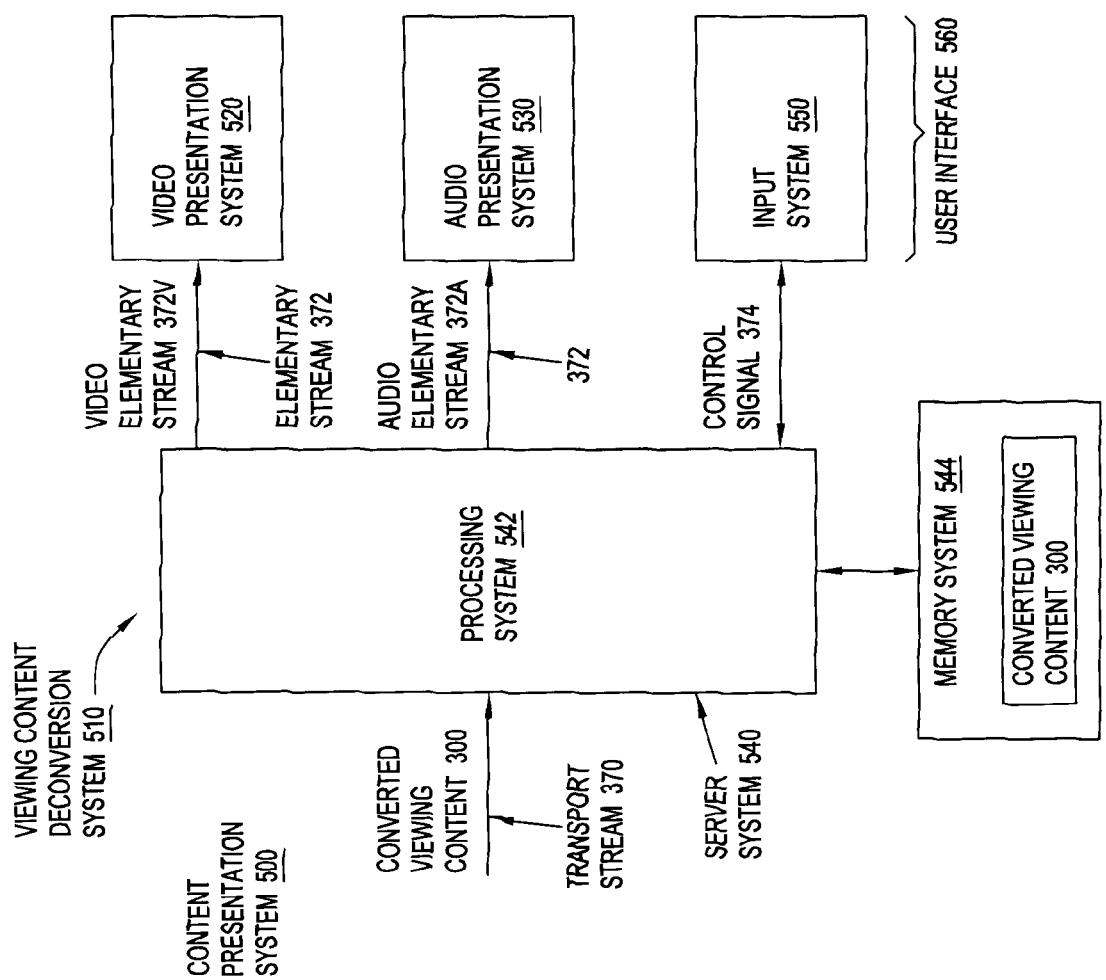
FIG. 8 is a detail drawing illustrating an exemplary embodiment of the content presentation system of FIG. 6, wherein the viewing content conversion system includes a processing system and a memory system.

The viewing content deconversion system 510 and is shown in FIG. 8 as comprising a computer server (or workstation) system 540. The server system 540 can be provided in any conventional manner, including in the manner set forth in more detail above with reference to the server system 110 (shown in FIG. 5). As illustrated in FIG. 8, the server system 540 can receive the transport stream 370 and can deconvert the received transport stream 370 into one or more video elemental streams 372V and/or audio elemental streams 372A as discussed above. The server system 540 thereby can provide the elemental streams 372 to the video presentation system 520 and/or the audio presentation system 530.

As shown in FIG. 8, the server system 540 can include a processing system 542 for receiving and processing the converted viewing content 300 and a memory system 544 for storing and providing the converted viewing content 300. Being provided in the manner set forth above with reference to the processing system 112 (shown in FIG. 5), the processing system 542 can comprise any appropriate number and type of conventional processing systems. Being coupled with the processing system 542, the memory system 544 can be provided in the manner discussed above with reference to the memory system 114 (shown in FIG. 5) and can include any conventional type of memory system for storing and providing other conventional types of information, including instruction code, such as software or firmware, intermediate calculation results, and other information associated with the processing system 542. As discussed above with reference to the memory system 114, the memory system 544 can provide at least temporary storage of the viewing content 200 if the viewing content conversion system 100 is incorporated with the viewing content presentation system 500 as illustrated in FIG. 7. If the transport stream 370 is provided in the Moving Picture Experts Group (MPEG) format, for example, the processing system 542 can perform conventional decoding and decompression operations on the transport stream 370 for providing the elemental streams 372 for presentation.

The server system 110 likewise may be coupled with an input system 550 for permitting a user to communicate with the viewing content presentation system 500. For example, the input system 550 can permit the user to enter one or more user instructions for controlling the operation of the viewing content presentation system 500. Illustrative instructions can include instructions for selecting viewing content 200 (shown in FIG. 1) for presentation and/or instructions for controlling the presentation of the selected viewing content 200. The input system 374 and the server system 110 can communicate by exchanging at least one control signal 374 as illustrated in FIG. 8.

The input system 550 can be provided in any conventional manner and typically includes one or more switches (or push-buttons), such as a keyboard or a keypad, and/or a pointing device, such as a mouse, trackball, or stylus. Exemplary input systems 550 are shown and described in the above-referenced co-pending U.S. patent applications, "SYSTEM AND METHOD FOR DOWNLOADING FILES," Ser. No. 10/772,565, filed on Feb. 4, 2004; and "PORTABLE MEDIA DEVICE AND METHOD FOR PRESENTING VIEWING CONTENT DURING TRAVEL," U.S. Ser. No. 11/154,749, filed on Jun. 15, 2005. The combination of the video presentation system 520, the audio presentation system 530, and/or the input system 550 can be referred to as being a user interface 560. As desired, the input system 550 can be at least partially combined with the video presentation system 520 and/or the audio presentation system 530.

Figure 9B:
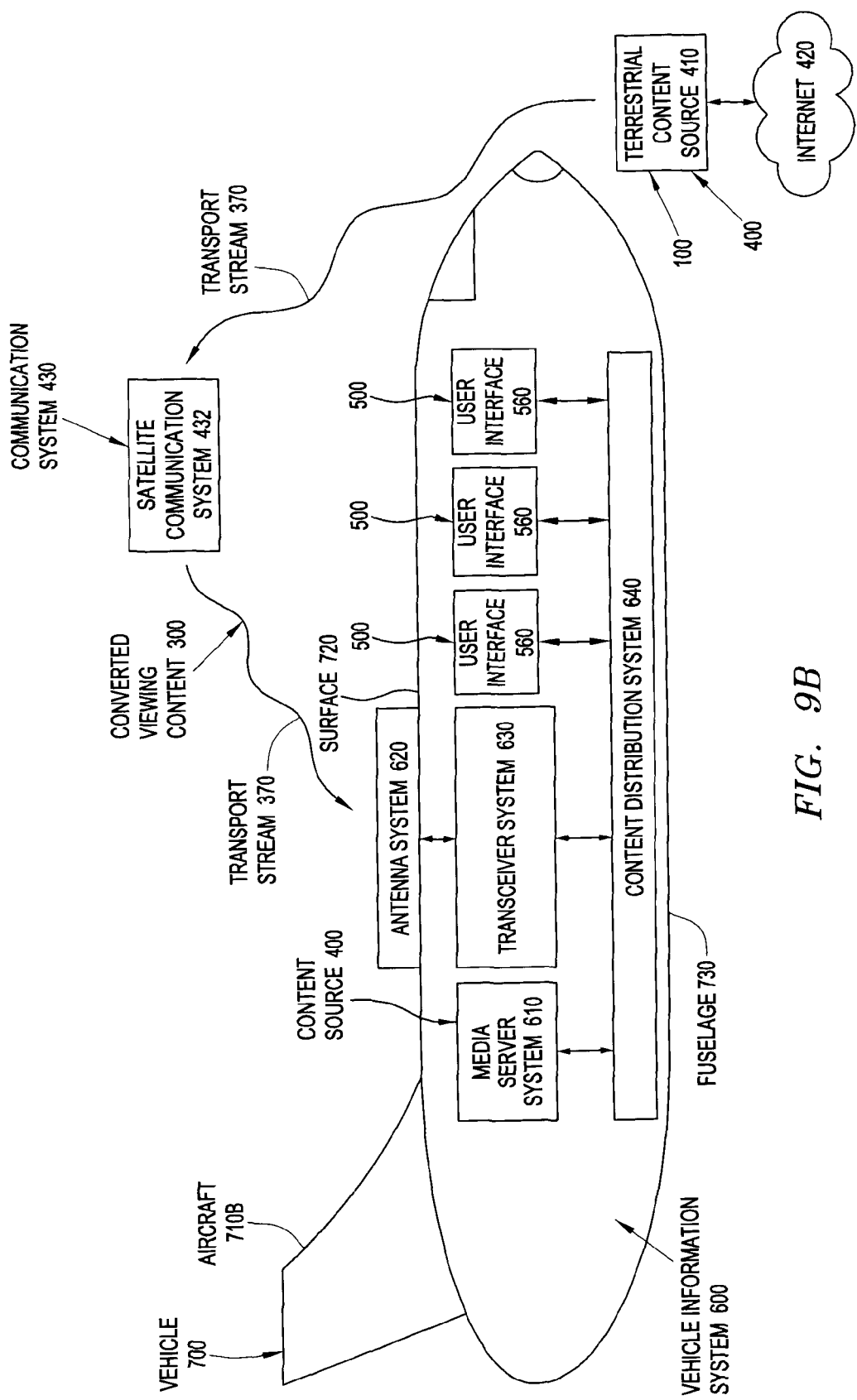
FIG. 9B is a detail drawing illustrating an alternative embodiment of the vehicle information system of FIG. 9A, wherein the vehicle information system is installed aboard an aircraft.

Although the viewing content conversion system 100 and/or the viewing content presentation system 500 may be used in conjunction with information systems that are disposed in fixed locations, such as buildings, the viewing content conversion system 100 and/or the viewing content presentation system 500 likewise can advantageously be applied in portable system applications. Turning to FIGS. 9A-B, for example, the viewing content conversion system 100 and/or the viewing content presentation system 500 can be applied in a vehicle information system 600 that can be configured for installation aboard a wide variety of vehicles 700. Exemplary types of vehicles can include an automobile 710A (shown in FIG. 9A), an aircraft 710B (shown in FIG. 9B), a bus, a recreational vehicle, a boat, and/or a locomotive, without limitation. If installed on an aircraft 710B as illustrated in FIG. 9B, for example, the vehicle information system 600 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

As shown in FIGS. 9A-B, the vehicle information system 600 can present viewing content from one or more conventional content sources 400 provided in the manner discussed in more detail above with reference to the content source 400 (shown in FIG. 5). The content sources 400 can include at least one internal content source, such as a server system 610, that are installed aboard the vehicle 700 and/or at least one remote content source 410, that can be external from the vehicle 700. The vehicle information system 600 can communicate with the content sources 400 in any conventional manner, including via wired and/or wireless communications. As shown in FIG. 9B, for example, the vehicle information system 600 can include an antenna system 620 and a transceiver system 630 for communicating with the remote content source 410 and for receiving viewing content. The antenna system 620 preferably is disposed outside the vehicle 700, such as on an exterior surface 720 of a fuselage 730 of the aircraft 710B.

The vehicle information system 600 and the remote content source 410 therefore can communicate in any conventional wireless manner, including directly and/or indirectly via an intermediate communication system 430, such as a satellite communication system 432. As desired, the remote content source 410 can be configured to communicate with other terrestrial content sources (not shown). The remote content source 410 is shown in FIG. 9B as providing access to the Internet 420. Although shown and described as comprising the satellite communication system 432 for purposes of illustration, it is understood that the communication system 430 can comprise any conventional type of wireless communication system, such as a cellular communication system (not shown) and/or an Aircraft Ground Information System (AGIS) communication system (not shown).

The vehicle information system 600 likewise can include at least one conventional media server system 610, for providing overall system control functions for the vehicle information systems 600 and/or at least one media (or file) server system for storing preprogrammed content and/or the received viewing content, as desired. The media server system 610 can include, and/or communicate with, one or more conventional peripheral media storage systems (not shown). Exemplary peripheral media storage systems can include optical media devices, such as a digital video disk (DVD) system and/or a compact disk (CD) system, and or magnetic media systems, such as a video cassette recorder (VCR) system and/or a hard disk drive (HDD) system, of any suitable kind, for storing preprogrammed content and/or the received viewing content.

Figure 10A:
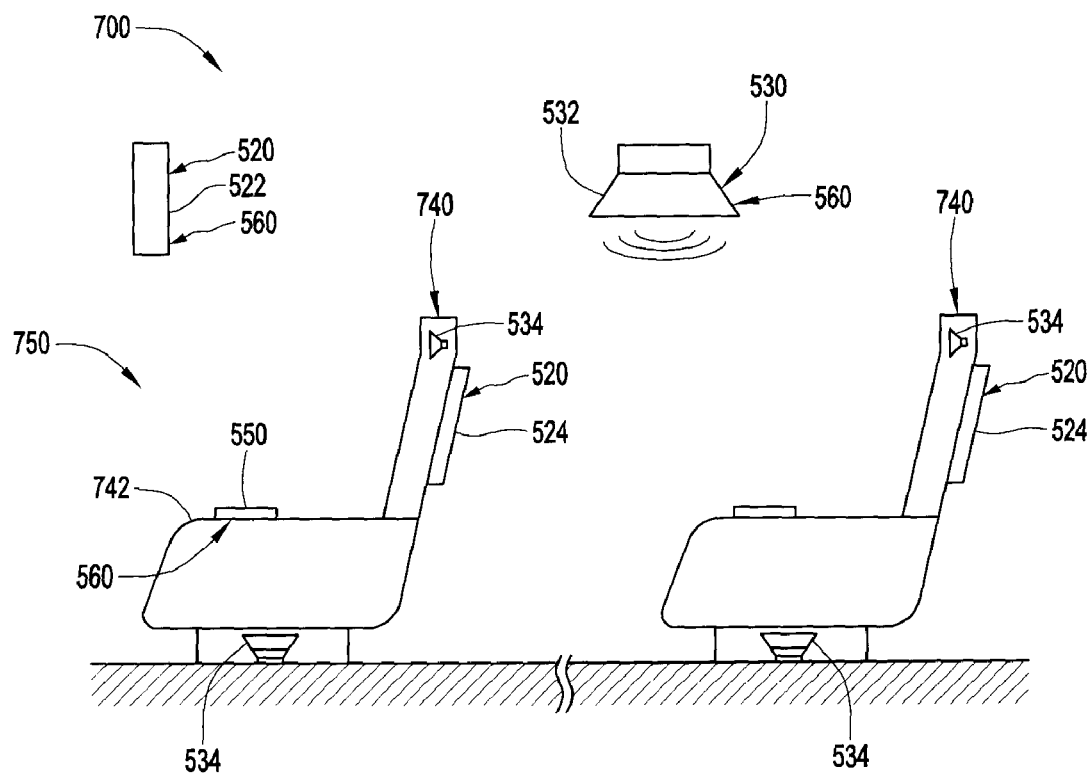
FIG. 10A is a detail drawing illustrating an exemplary passenger cabin of the passenger vehicle of FIGS. 9A-B, wherein the plurality of content presentation systems is associated with a plurality of passenger seats.
Figure 10B:
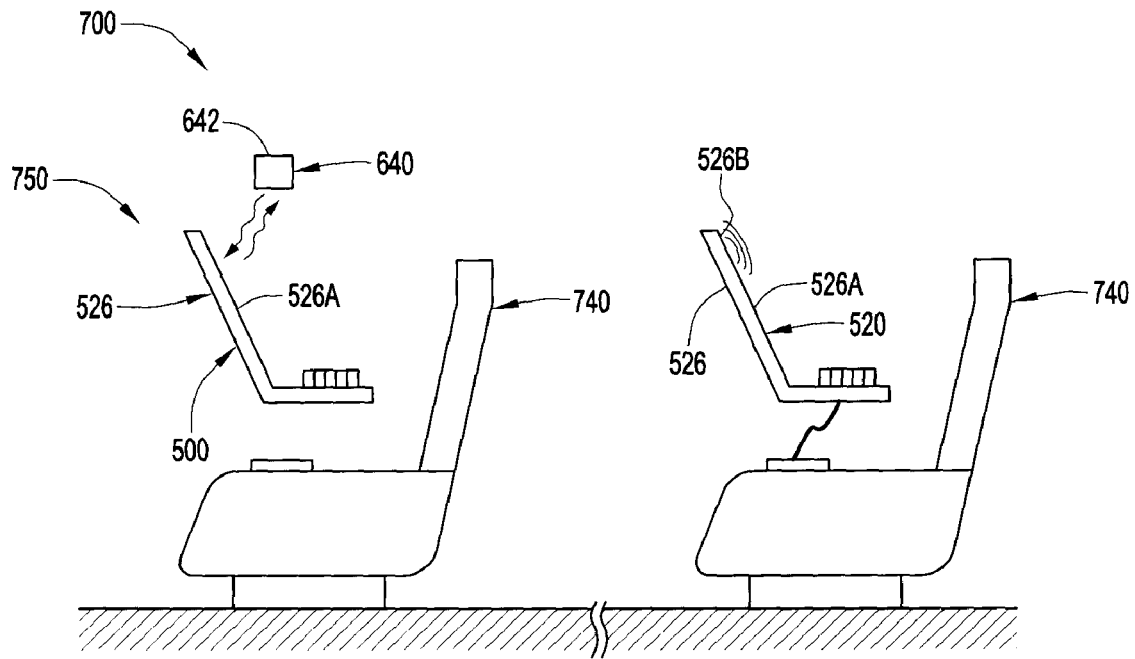
FIG. 10B is a detail drawing illustrating another alternative embodiment of the exemplary passenger cabin of FIG. 10A, in which the plurality of content presentation systems is associated with a plurality of portable media devices.

One or more user (or passenger) interface systems 560 are provided for selecting preprogrammed content and/or the received viewing content and for presenting the selected preprogrammed content and/or viewing content. Being provided in the manner set forth above with reference to FIGS. 6-8, the passenger interface systems 560 can be associated with the viewing content conversion system 100 and/or the viewing content presentation system 500 and, as illustrated in FIGS. 10A-B, can include a video presentation system 520 and/or an audio presentation system 530. Overhead cabin display systems 522 with central controls, seatback display systems 524 with individualized controls, crew display panels, and/or a display system 526A of a handheld presentation system 526 are exemplary video presentation systems 520. Illustrative audio presentation systems 530 can be provided via an overhead cabin audio system 532, an audio system 534 disposed within at least one passenger seat 740, an audio system 526B of the handheld presentation systems 526, and/or headphones (not shown). As desired, one or more of the handheld presentation systems 526 can be provided as portable media devices as set forth in the above-referenced co-pending U.S. patent application, "PORTABLE MEDIA DEVICE AND METHOD FOR PRESENTING VIEWING CONTENT DURING TRAVEL," Ser. No. 11/154,749, filed on Jun. 15, 2005.

When the viewing content presentation system 500 is provided adjacent to the passenger seats 740, the passenger seats 740 can be associated with an input system 550. The input system 550 provides passenger control over the selection of the preprogrammed content and/or the received viewing content and the presentation of the selected preprogrammed content and/or viewing content. As illustrated in FIG. 10B, the input system 550 can be provided on an armrest 7442 of the passenger seats 740. A processing system 542 (shown in FIG. 8) and/or a memory system (shown in FIG. 8) for storing and/or decrypting the content likewise can be disposed adjacent to the passenger seats 740. Passengers who are traveling aboard the vehicle 700 thereby can enjoy the preprogrammed content and/or the received viewing content during travel.

The antenna system 620 and the transceiver system 630 of the vehicle information system 600 is illustrated in FIG. 9B as communicating with the media server system 610 and the passenger interface systems 560 via a distribution system 640. The distribution system 640 can be provided in any conventional manner and is configured to support any conventional type of communications, including wired communications and/or wireless communications, as set forth the above-referenced co-pending U.S. patent applications, "SYSTEM AND METHOD FOR DOWNLOADING FILES," Ser. No. 10/772,565, filed on Feb. 4, 2004; "PORTABLE MEDIA DEVICE AND METHOD FOR PRESENTING VIEWING CONTENT DURING TRAVEL," U.S. Ser. No. 11/154,749, filed on Jun. 15, 2005; "SYSTEM AND METHOD FOR MANAGING CONTENT ON MOBILE PLATFORMS," U.S. Ser. No. 11/123,327, filed on May 6, 2005; and "SYSTEM AND METHOD FOR RECEIVING BROADCAST CONTENT ON A MOBILE PLATFORM DURING INTERNATIONAL TRAVEL," U.S. Ser. No. 11/269,378, filed on Nov. 7, 2005.

Preferably being distributed via high-speed data communications, the preprogrammed content and/or the received viewing content can be distributed throughout the vehicle information system 600 in any suitable manner. Since vehicle information system 600 can maintain the encrypted format of the converted viewing content 300, the distribution system 640 of the vehicle information system 600 preferably is configured to support decryption. For example, the distribution system 640 can include at least one tapping unit (TU), at least one seat electronics box (SEB), including any enhanced seat electronics boxes (ESEBs) and/or any premium seat electronics boxes (PSEBs), and/or at least one audio and/or video presentation system, each supporting decryption, for example, of live broadcast transport streams and/or Audio Video on Demand (AVOD) transport streams.

Exemplary manners for distributing the preprogrammed content and/or the received viewing content can include the manner set forth in the co-pending U.S. patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006, which is assigned to the assignee of the present application and the disclosure of which is hereby incorporated herein by reference in its entirety. U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," the disclosures of which are hereby incorporated herein by reference in their entireties, likewise disclose exemplary manners for distributing the preprogrammed content and/or the received viewing content.

Turning to FIG. 10B, the distribution system 640 can include one or more access points 642 for wirelessly communicating with the handheld presentation system 526. Each access point 642 can be provided in any conventional manner and preferably are provided in the manner set forth in the above-referenced co-pending U.S. patent application, "PORTABLE MEDIA DEVICE AND METHOD FOR PRESENTING VIEWING CONTENT DURING TRAVEL," Ser. No. 11/154,749, filed on Jun. 15, 2005. The access points 642 of the content distribution system 640 can be distributed throughout the passenger cabin 750 in any suitable manner such that each passenger seat 740 is within a coverage area of at least one access point 642. The entire passenger cabin 750 preferably is within a coverage area of one or more access points 642. Thereby, if the access points 642 comprise wireless access points, the handheld presentation systems 526 can maintain communication with the content sources 400 when the handheld presentation systems 526 are carried about the passenger cabin 750. Stated somewhat differently, the passenger cable 570 can comprise a wireless hot spot, such as wireless fidelity (Wi-Fi) hot spot and/or a Bluetooth hot spot.

Returning to FIG. 9B, the content source 400, in operation, can produce the converted viewing content 300 in the manner discussed in more detail above. The converted viewing content 300 can be stored by the content source 400 and/or can be provided as the transport stream 370 with the encrypted transport stream payload 380 (shown in FIGS. 4B-C). The content source 400 can provide the converted viewing content 300 to the vehicle information system 600 in any conventional manner. For example, the content source 400 can upload the converted viewing content 300 to the vehicle information system 600 prior to departure and/or, as illustrated in FIG. 9B, can transmit the converted viewing content 300 to the vehicle information system 600 during travel. The content source 400 likewise can stream the converted viewing content 300 to the vehicle information system 600 as the transport stream 370. The converted viewing content 300 thereby can be at least partially protected against any unauthorized use, copying, and/or dissemination, and/or, even if intercepted or otherwise stolen, the converted viewing content 300 will not be readily usable.

Receiving the converted viewing content 300, the vehicle information system 600 can distribute the converted viewing content 300 to one or more of the viewing content presentation systems 500 adjacent to the passenger seats 740 (shown in FIGS. 10A-B). The vehicle information system 600 can distribute the converted viewing content 300 in real time upon receipt and/or can store the converted viewing content 300 in the media server system 610 for subsequent distribution. The viewing content presentation systems 500 can receive the converted viewing content 300. The viewing content presentation systems 500 likewise can store the converted viewing content 300 for subsequent presentation and/or can deconvert the converted viewing content 300 for presentation in real time via the video presentation system 520 and/or the audio presentation system 530 in the manner discussed in more detail with reference to FIG. 8.

The vehicle information system 600 can provide the converted viewing content 300 to the viewing content presentation system 500 in any conventional manner. The converted viewing content 300 preferably is streamed to the viewing content presentation systems 500. The viewing content presentation systems 500 can decrypt the encrypted transport stream payload 380 (shown in FIGS. 4B-C) of the transport stream 370 on-the-fly (and/or in real time). Thereby, the transport stream 370 can be decrypted into the elemental video stream 372V and/or the elemental audio stream 372A adjacent to the passenger seats 740 and/or near the video presentation system 520 and/or the audio presentation system 530.

Although the converted viewing content 300 preferably is provided to the vehicle information system 600 as discussed above, the content source 400 likewise can provide the viewing content 200 to the vehicle information system 600. The vehicle information system 600 thereby can include the viewing content conversion system 100 (shown in FIG. 1) to convert the received viewing content 200 into the converted viewing content 300 in the manner set forth in more detail above. The viewing content conversion system 100 included in any conventional manner. For example, the viewing content conversion system 100 can be associated with the media server system 610, can be associated with the user interfaces 560, and/or can be provided as a substantially separate system. Stated somewhat differently, the vehicle information system 600 can include one or more viewing content presentation system 500 that includes an incorporated viewing content conversion system 100 in the manner discussed above with reference to FIG. 7. The viewing content 200 thereby can be converted into the converted viewing content 300 aboard the vehicle 700 such that the converted viewing content 300 can be stored for subsequent distribution and/or provided to the viewing content presentation system 500 for presentation.

Each video access unit can be configured to start at the beginning of the transport stream payload 380. As set forth in the Advanced Television Systems Committed (ATSC) Standard No. A/53 and defined in Section 2.1.1 of the International Organization for Standardization (ISO) and the International Electrotechnical Commission (IEC) Standard 13818-1, each Packetized Elementary Stream (PES) frame 340 (shown in FIGS. 4B-C) can begin with a video access unit that is aligned with the Packetized Elementary Stream (PES) frame 382 (shown in FIGS. 4B-C). Preferably, the first byte of the transport stream payload 380 is the first byte of an associated video access unit.

The viewing content conversion system 100 and/or the viewing content presentation system 500 therefore advantageously avoid the problems, such as specific encryption blocksize restrictions and impair presentation of encrypted viewing content, associated with currently-available conventional file-based encryption systems by encrypting only a portion, such as the payload 380, of the transport stream 370. All licensed viewing content and other data, which typically is supplied in an encrypted format, can thereby remain in an encrypted format when static (such as stored within a memory system) and/or during transmission to, and distribution within, the vehicle information system. Therefore, transport stream header information 350 can remain unencrypted, allowing for indexing or extracting I-frames 340II (shown in FIG. 3B) without requiring decryption of the viewing content prior to delivery to the vehicle information system 600. Indexing or extraction of the I-frames 340II prior to streaming can be applied to facilitate a digital video disk (DVD)-like functionality, such as fast-forward operations and/or rewind operations, in light of the available bandwidth (e.g. 5 Mbps per video stream).

Use of the viewing content conversion system 100 and/or the viewing content presentation system 500 thereby can increase data security, simplify steps involving data transfer to the vehicle information system 600, and/or preserve a predetermined bandwidth load allowance per vehicle passenger when selected functions, such as fast-forward operations and/or rewind operations, are performed. Further, if encryption of the payload 380, of the transport stream 370 is adopted as a standard practice in the relevant travel industry, the need to decrypt and re-encrypt data, such as viewing content, prior to transmission to the vehicle information 600 can be avoided. Potential savings therefore can include significant time savings for each minute of streamed viewing content multiplied by an amount of viewing content processed by the viewing content conversion system 100.

The disclosure is susceptible to various modifications and alternative forms, and specific examples thereof have been shown by way of example in the drawings and are herein described in detail. It should be understood, however, that the disclosure is not to be limited to the particular forms or methods disclosed, but to the contrary, the disclosure is to cover all modifications, equivalents, and alternatives.

What is claimed is:

1. A packetized transport stream stored in a non-transitory computer readable medium and suitable for transmitting preselected viewing content in accordance with a predetermined frame sequence, comprising:
   a plurality of content frames having a uniform type, each of said content frames including:
      a transport frame payload being encrypted and including the preselected viewing content; and
      an unencrypted transport frame header for enabling a selected content frame to be extracted without decrypting said transport frame payload of the selected content frame and including a packet identifier field for indicating whether said transport frame payload is encrypted, a payload unit start indicator field for indicating whether said transport frame payload has a packetized elementary stream header, and a transport priority field for indicating whether the selected content frame comprises an index frame and for supporting smooth jump operations within the packetized transport stream by enabling searches for index frames among said content frames within the predetermined frame sequence without decoding said transport frame payloads of said content frames, none of the preselected viewing content being included in said transport frame header, said transport frame payload following said transport frame header and comprising a remainder of each content frame,
   wherein all of the preselected viewing content in the packetized transport stream remains in an encrypted format during transmission such that the preselected viewing content is protected against unauthorized access without impairing presentation of the preselected viewing content.

2. The packetized transport stream of claim 1, wherein said packetized transport stream comprises a Moving Picture Experts Group transport stream.

3. The packetized transport stream of claim 2, wherein the index frame comprises an intra-coded image frame.

4. The packetized transport stream of claim 1, wherein said transport frame payload comprises one or more content fields.

5. The packetized transport stream of claim 4, wherein at least one of said content fields is at least one of a video content field for storing video content, an audio content field for storing audio content, and a closed-caption field for storing closed-captioned content.

6. The packetized transport stream of claim 1, wherein said transport frame header consists of the packet identifier field, the payload unit start indicator field, and the transport priority field.

7. The packetized transport stream of claim 4, wherein said content fields include a video content field for storing video content and at least one audio content field for storing audio content, said video content being synchronized with said audio content.

8. The packetized transport stream of claim 1, wherein each of said content frames comprises a packetized elementary stream frame, and said transport frame payload for each of said content frames includes a packetized elementary stream header.

9. The packetized transport stream of claim 1, wherein said transport frame payload is encrypted in accordance with an encryption technique selected from the group consisting of a private key encryption technique, a cipher block chaining mode technique, and proprietary encryption technique.

10. The packetized transport stream of claim 9, wherein said packetized transport stream is associated with a unique encryption key.

11. The packetized transport stream of claim 9, wherein each of said content frames can be independently decrypted.

12. The packetized transport stream of claim 1, wherein at least one of said content frames includes an adaptation field for providing packet timing information.

13. A content conversion system for converting preselected viewing content suitable for presentation in accordance with a predetermined frame sequence and for which protection from unauthorized access is desirable into a packetized, transport stream, comprising:
   a processing system for receiving the viewing content and for providing a plurality of content frames having a uniform type, each of said content frames including:
      a transport frame payload being encrypted and including the preselected viewing content; and
      an unencrypted transport frame header for enabling a selected content frame to be extracted without decrypting said transport frame payload of the selected content frame and including a packet identifier field for indicating whether said transport frame payload is encrypted, a payload unit start indicator field for indicating whether said transport frame payload has a packetized elementary stream header, and a transport priority field for indicating whether the selected content frame comprises an index frame and for supporting smooth jump operations within the packetized transport stream by enabling searches for index frames among said content frames within the predetermined frame sequence without decoding said transport frame payloads of said content frames, none of the preselected viewing content being included in said transport frame header, said transport frame payload following said transport frame header and comprising a remainder of each content frame,
wherein all of the preselected viewing content in the packetized transport stream remains in an encrypted format during transmission such that the preselected viewing content is protected against unauthorized access without impairing presentation of the preselected viewing content.

14. The content conversion system of claim 13, wherein said processing system receives the viewing content via a content receiving system.

15. The content conversion system of claim 14, wherein said content receiving system includes an encoding system for encoding the viewing content and for providing the encoded viewing content to said processing system.

16. The content conversion system of claim 14, wherein said content receiving system includes a compression system for compressing the viewing content and for providing the compressed viewing content to said processing system.

17. The content conversion system of claim 13, further comprising a memory system for storing said plurality of content frames such that encryption of said preselected viewing content is maintained.

18. The content conversion system of claim 13, further comprising a content transmitting system for transmitting said plurality of content frames in accordance with a predetermined frame sequence, said content transmitting system maintaining encryption of said preselected viewing content during transmission.

19. The content conversion system of claim 18, wherein said content transmitting system receives said plurality of content frames from said processing system.

20. The content conversion system of claim 18, further comprising a memory system for storing said plurality of content frames such that encryption of said preselected viewing content is maintained, said content transmitting system receiving said plurality of content frames from said memory system.

21. The content conversion system of claim 18, wherein said content transmitting system comprises a transport multiplexer system for multiplexing a plurality of elemental streams to form the packetized transport stream.

22. The content conversion system of claim 18, wherein said processing system applies said transport priority field from said transport frame headers of said content frames to perform an independent jump operation and transmits said plurality of content frames in accordance with said independent jump operation.

23. The content conversion system of claim 22, wherein said independent jump operation is selected from the group consisting of a fast-forward operation, a rewind operation, a fast rewind operation, and a search operation.

24. The content conversion system of claim 22, wherein said processing system applies said transport priority field from said transport frame headers of said content frames to perform a search operation for a selected partially-encrypted content frame.

25. The content conversion system of claim 18, wherein said content conversion system provides the packetized transport stream to a content presentation system for decrypting and presenting the viewing content provided via the packetized transport stream.

26. The content conversion system of claim 25, wherein said content conversion system is at least partially incorporated with said content presentation system.

27. The content conversion system of claim 13, wherein the content conversion system is associated with a content source for transmitting the packetized transport stream.

28. The content conversion system of claim 13, wherein the content conversion system is suitable for installation aboard a passenger vehicle.

29. The content conversion system of claim 13, wherein the content conversion system is installed aboard an aircraft.

30. A method for transmitting preselected viewing content suitable for presentation in accordance with a predetermined frame sequence and for which protection from unauthorized access is desirable via a packetized transport stream, comprising:
providing the viewing content as a plurality of unencrypted content frames, each of said unencrypted content frames including:
an unencrypted transport frame header including information for handling and presenting said unencrypted content frame and none of the preselected viewing content; and
an unencrypted transport frame payload including the preselected viewing content; and
converting said unencrypted content frames into a plurality of partially-encrypted content frames having a uniform type by, for each of said unencrypted content frames,
encrypting said unencrypted transport frame payload to provide an encrypted transport frame payload;
including within said transport frame header a packet identifier field for indicating that said unencrypted transport frame payload has been encrypted, a payload unit start indicator field for indicating whether said transport frame payload has a packetized elementary stream header, and a transport priority field for indicating whether the selected content frame comprises an index frame and for supporting smooth, jump operations within the packetized transport stream by enabling searches for index frames among said content frames within the predetermined frame sequence without decoding said transport frame payloads of said content frames; and
combining said encrypted transport frame payload with said transport frame header, said encrypted transport frame payload following said transport frame header and comprising a remainder of each content frame,
wherein said selected partially encrypted content frames can be extracted without decrypting said encrypted transport frame payload of said selected partially-encrypted content frames and wherein all of the preselected viewing content in the packetized transport stream remains in an encrypted format during transmission such that the preselected viewing content is protected against unauthorized access without impairing presentation of the preselected viewing content.

31. The method of claim 30, wherein said providing the viewing content includes receiving the viewing content from an external content source.

32. The method of claim 30, wherein said providing the viewing content includes providing the viewing content in a format selected from the group consisting of a Moving Picture Experts Group 1 (MPEG-1) format and a Moving Picture Experts Group 2 (MPEG-2) format.

33. The method of claim 30, wherein said providing the viewing content includes providing said unencrypted transport frame payload with at least one content field.

34. The method of claim 33, wherein said providing said unencrypted transport frame payload with said at least one content field includes providing said unencrypted transport frame payload with a video content field for storing video content.

35. The method of claim 33, wherein said providing said unencrypted transport frame payload with said at least one content field includes providing said unencrypted transport frame payload with an audio content field for storing audio content.

36. The method of claim 33, wherein said providing said unencrypted transport frame payload with said at least one content field includes providing said unencrypted transport frame payload with a selected content field for storing closed-captioned content.

37. The method of claim 30, wherein said providing the viewing content includes providing each of said content frames as a packetized elementary stream frame and providing said encrypted transport frame payload for each of said content frames with a packetized elementary stream header.

38. The method of claim 30, wherein said encrypting said unencrypted transport frame payload includes encrypting said unencrypted transport frame payload in accordance with an encryption technique selected from the group consisting of a private key encryption technique, a cipher block chaining mode technique, and proprietary encryption technique.

39. The method of claim 38, wherein said encrypting said unencrypted transport frame payload includes associating said packetized transport stream with a unique encryption key.

40. The method of claim 38, wherein said encrypting said unencrypted transport frame payload includes encrypting said unencrypted transport frame payload such that each of said content frames can be independently decrypted.

41. The method of claim 30, wherein said providing the viewing content includes providing at least one of said content frames with an adaptation field for providing packet timing information.

42. The method of claim 30, further comprising transmitting said plurality of partially-encrypted content frames as at least one elementary stream in accordance with a predetermined frame sequence.

43. The method of claim 42, wherein said transmitting said plurality of partially-encrypted content frames includes applying said transport priority field from said transport frame headers of said partially-encrypted content frames to perform independent jump operations.

44. The method of claim 43, wherein said applying said transport priority field from said transport frame headers includes performing a selected jump operation selected from the group of fast-forward operations, rewind operations, fast rewind operations, and search operations.

45. The method of claim 43, wherein, said applying said transport priority field from said transport frame headers includes performing search operations for a selected partially-encrypted content frame.

46. The method of claim 30, wherein said converting said unencrypted content frames further includes encoding said unencrypted content frames.

47. The method of claim 30, wherein said converting said unencrypted content frames further includes compressing said unencrypted content frames.

48. The method of claim 30, further comprising storing said plurality of partially-encrypted content frames in a memory system.

49. The method of claim 30, further comprising transmitting said plurality of partially-encrypted content frames in accordance with a predetermined frame sequence such that encryption of said preselected viewing content is maintained during transmission.

50. The method of claim 49, wherein said transmitting said plurality of partially-encrypted content frames includes multiplexing a plurality of elemental streams to form the packetized transport stream.

51. The method of claim 49, wherein said transmitting said plurality of partially-encrypted content frames includes applying said transport priori field from said transport frame headers of said partially-encrypted content frames to perform an independent jump operation and transmits said plurality of partially-encrypted content frames in accordance with said independent jump operation.

52. The method of claim 51, wherein said applying said transport priority field from said transport frame headers includes performing a selected jump operation selected from the group consisting of a fast-forward operation, a rewind operation, a fast rewind operation, and a search operation.

53. The method of claim 49, wherein said transmitting said plurality of partially-encrypted content frames includes applying said transport priority field from said transport frame headers of said partially-encrypted content frames to perform a search operation for a selected partially-encrypted content frame.

54. The method of claim 49, further comprising providing the packetized transport stream to a content presentation system for decrypting and presenting the viewing content provided via the packetized transport stream.

55. A content presentation system for presenting preselected viewing content provided in accordance with a predetermined frame sequence via a packetized transport stream, comprising:
   a processing system for receiving the packetized transport stream with a plurality of content frames having a uniform type, each of said content frames including:
      a transport frame payload being encrypted and including the preselected viewing content; and
      an unencrypted transport frame header including a packet identifier field for indicating whether said transport frame payload is encrypted, a payload unit start indicator field for indicating whether said transport frame payload has a packetized elementary stream header, a transport priority field for indicating whether the selected content frame comprises an index frame and for supporting smooth jump operations within the packetized transport stream by enabling searches for index frames among said content frames within the predetermined frame sequence without decoding said transport frame payloads of said content frames, and none of the preselected viewing content, said transport frame header enabling selected content frames to be extracted without decrypting said transport frame payload of said selected content frames, said transport frame payload following said transport frame header and comprising a remainder of each content frame,
   said processing system decrypting said transport frame payload of at least one of said of content frames and providing said preselected viewing content as one or more elementary streams for presentation,
   wherein all of the viewing content in the packetized transport stream remains in an encrypted format during transmission such that the preselected viewing content is protected against unauthorized access without impairing presentation of the preselected viewing content.

56. The content presentation system of claim 55, wherein said processing system decodes said transport frame payload of said at least one of said of content frames to provide said preselected viewing content.

57. The content presentation system of claim 55, wherein said processing system decompresses said transport frame payload of said at least one of said of content frames to provide said preselected viewing content.

58. The content presentation system of claim 55, wherein said processing system receives the packetized transport stream from a content conversion system.

59. The content presentation system of claim 57, wherein said processing system receives the packetized transport stream from a content conversion system.

60. The content presentation system of claim 59, wherein said content conversion system is at least partially incorporated with said content presentation system.

61. The content presentation system of claim 59, wherein the content conversion system is associated with a content source.

62. The content presentation system of claim 55, further comprising a memory system for storing said plurality of content frames as stored content frames such that encryption of said preselected viewing content is maintained.

63. The content presentation system of claim 62, wherein said processing system stores said plurality of content frames of the packetized transport stream in said memory system.

64. The content presentation system of claim 62, wherein said processing system retrieves at least one of said stored content frames from said memory system, said processing system decrypting said transport frame payload of said at least one of said stored content frames.

65. The content presentation system of claim 55, further comprising a user interface for presenting said one or more elementary streams.

66. The content presentation system of claim 65, wherein said user interface includes a video presentation system for presenting the viewing content associated with a video elementary stream included with said one or more elementary streams.

67. The content presentation system of claim 65, wherein said user interface includes an audio presentation system for presenting the viewing content associated with an audio elementary stream included with said one or more elementary streams.

68. The content presentation system of claim 65, wherein said user interface includes an input system for controlling presentation of the viewing content.

69. The content presentation system of claim 55, wherein the content presentation system is disposed within a portable media device.

70. The content presentation system of claim 55, wherein the content conversion system is suitable for installation aboard a passenger vehicle.

71. The content presentation system of claim 55, wherein the content conversion system is installed aboard an aircraft.

72. A method for presenting viewing content provided in accordance with a predetermined frame sequence via a packetized transport stream, comprising:

receiving the packetized transport stream with a plurality of content frames having a uniform type, each of said content frames including:
a transport frame payload being encrypted and including preselected viewing content for which protection from unauthorized access is desirable; and
an unencrypted transport frame header including a packet identifier field for indicating whether said transport frame payload is encrypted, a payload unit start indicator field for indicating whether said transport frame payload has a packetized elementary stream header, a transport priority field for indicating whether the selected content frame comprises an index frame and for supporting smooth jump operations within the packetized transport stream by enabling searches for index frames among said content frames within the predetermined frame sequence without decoding said transport frame payloads of said content frames, and none of the preselected viewing content, said transport frame header enabling selected content frames to be extracted without decrypting said transport frame payload of said selected content frames, said transport frame payload following said transport frame header and comprising a remainder of each content frame, decrypting said transport frame payload of at least one of said of content frames; and providing said preselected viewing content as one or more elementary streams for presentation, wherein all of the viewing content in the packetized transport stream remains in an encrypted format during transmission such that the preselected viewing content is protected against unauthorized access without impairing presentation of the preselected viewing content.

73. The method of claim 72, wherein said receiving the packetized transport stream includes receiving the packetized transport stream from a content conversion system.

74. The method of claim 72, wherein said decrypting said transport frame payload includes decoding said transport frame payload of said at least one of said of content frames.

75. The method of claim 72, wherein said decrypting said transport frame payload includes decompressing said transport frame payload of said at least one of said of content frames.

76. The method of claim 72, further comprising storing said plurality of content frames in a memory system as stored content frames such that encryption of said preselected viewing content is maintained.

77. The method of claim 76, wherein said decrypting said transport frame payload comprises retrieving at least one of said stored content frames from said memory system and decrypting said transport frame payload of said at least one of said stored content frames.

78. The method of claim 72, further comprising providing a user interface for presenting said one or more elementary streams.

79. The method of claim 78, wherein said providing said user interface user interface includes providing a video presentation system for presenting the viewing content associated with a video elementary stream included with said one or more elementary streams.

80. The method of claim 78, wherein said providing said user interface user interface includes providing an audio presentation system for presenting the viewing content associated with an audio elementary stream included with said one or more elementary streams.

81. A content presentation system for presenting viewing content in accordance with a predetermined frame sequence, comprising:

a first processing system for converting the viewing content into a packetized transport stream with a plurality of content frames and for transmitting said packetized transport stream, each of said content frames being of a uniform type and including:
a transport frame payload being encrypted and including preselected viewing content for which protection from unauthorized access is desirable; and an unencrypted transport frame header including a packet identifier field for indicating whether said transport frame payload is encrypted, a payload unit start indicator field for indicating whether said transport frame payload has a packetized elementary stream header, a transport priority field for indicating whether the selected content frame comprises an index frame and for supporting smooth jump operations within the packetized transport stream by enabling searches for index frames among said content frames within the predetermined frame sequence without decoding said transport frame payloads of said content frames, and none of the preselected viewing content, said transport frame header enabling selected content frames to be extracted without decrypting said transport frame payload of said selected content frames, said transport frame payload following said transport frame header and comprising a remainder of each content frame, a second processing system for receiving said packetized transport stream from said first processing system, said second processing system decrypting said transport frame payload of at least one of said of content frames and providing said preselected viewing content as one or more elementary streams for presentation, wherein all of the viewing content in the packetized transport stream remains in an encrypted format during transmission such that the preselected viewing content is protected against unauthorized access without impairing presentation of the preselected viewing content.

82. A method for presenting viewing content in accordance with a predetermined frame sequence, comprising:
at a first location,
converting the viewing content into a packetized transport stream with a plurality of content frames, each of said content frames being of a uniform type and including:
an encrypted transport frame payload including preselected viewing content for which protection from unauthorized access is desirable; and
an unencrypted transport frame header including a packet identifier field for indicating whether said transport frame payload is encrypted, a payload unit start indicator field for indicating whether said transport frame payload has a packetized elementary stream header, a transport priority field for indicating whether the selected content frame comprises an index frame and for supporting smooth jump operations within the packetized transport stream by enabling searches for index frames among said content frames within the predetermined frame sequence without decoding said transport frame payloads of said content frames, and none of the preselected viewing content, said transport frame header enabling selected content frames to be extracted without decrypting said transport frame payload of said selected content frames, said transport frame payload following said transport frame header and comprising a remainder of each content frame,
transmitting said packetized transport stream; and
at a second location,
receiving said packetized transport stream;
decrypting said transport frame payload of at least one of said of content frames; and
providing said preselected viewing content as one or more elementary streams for presentation, wherein all of the viewing content in the packetized transport stream remains in an encrypted format during transmission such that the preselected viewing content is protected against unauthorized access without impairing presentation of the preselected viewing content.

83. A passenger interface for a vehicle information system and for presenting viewing content provided in accordance with a predetermined frame sequence via a packetized transport stream from a content source, comprising:
a processing system for receiving the packetized transport stream with a plurality of content frames, each of said content frames being of a uniform type and including:
a transport frame payload being encrypted and including preselected viewing content for which protection from unauthorized access is desirable; and
an unencrypted transport frame header including a packet identifier field for indicating whether said transport frame payload is encrypted, a payload unit start indicator field for indicating whether said transport frame payload has a packetized elementary stream header, a transport priority field for indicating whether the selected content frame comprises an index frame and for supporting smooth jump operations within the packetized transport stream by enabling searches for index frames among said content frames within the predetermined frame sequence without decoding said transport frame payloads of said content frames, and none of the preselected viewing content, said transport frame header enabling selected content frames to be extracted without decrypting said transport frame payload of said selected content frames, said transport frame payload following said transport frame header and comprising a remainder of each content frame,
said processing system decrypting said transport frame payload of at least one of said of content frames and providing said preselected viewing content as a video elementary stream and an audio elementary stream;
a video presentation system for presenting the viewing content associated with said video elementary stream; and
an audio presentation system for presenting the viewing content associated with said audio elementary stream,
wherein all of the viewing content in the packetized transport stream remains in an encrypted format during transmission such that the preselected viewing content is protected against unauthorized access without impairing presentation of the preselected viewing content.

84. A vehicle information system for installation aboard a passenger vehicle and for presenting viewing content in accordance with a predetermined frame sequence, comprising:
a content source for providing a packetized transport stream with a plurality of content frames, each of said content frames being of a uniform type and including:
an encrypted transport frame payload including preselected viewing content for which protection from unauthorized access is desirable; and
an unencrypted transport frame header including a packet identifier field for indicating whether said transport frame payload is encrypted, a payload unit start indicator field for indicating whether said transport frame payload has a packetized elementary stream header, a transport priority field for indicating whether the selected content frame comprises an index frame and for supporting smooth jump operations within the packetized transport stream by enabling searches for index frames among said content frames within the predetermined frame sequence without decoding said transport frame payloads of said content frames, and none of the preselected viewing content, said transport frame header enabling selected content frames to be extracted without decrypting said transport frame payload of said selected content frames, said transport frame payload following said transport frame header and comprising a remainder of each content frame;

a distribution system; and at least one passenger interface in communication with said content source via said distribution system, each of said at least one passenger interface including:
 a processing system for receiving the packetized transport stream, said processing system decrypting said transport frame payload of at least one of said of content frames and providing said preselected viewing content as a video elementary stream and an audio elementary stream;
 a video presentation system for presenting the viewing content associated with said video elementary stream; and
 an audio presentation system for presenting the viewing content associated with said audio elementary stream,
 wherein all of the viewing content in the packetized transport stream remains in an encrypted format during transmission such that the preselected viewing content is protected against unauthorized access without impairing presentation of the preselected viewing content.

85. The vehicle information system of claim 84, wherein the vehicle information system is disposed aboard an airplane.

86. The vehicle information system of claim 84, wherein said distribution system comprises a wired distribution system.

87. The vehicle information system of claim 86, wherein said wired distribution system supports wired communications having a protocol type selected from the group of protocol standards consisting of Ethernet, Fast Ethernet, and Gigabit Ethernet.

88. The vehicle information system of claim 84, wherein said distribution system comprises a wireless distribution system.

89. The vehicle information system of claim 88, wherein said wireless distribution system supports wireless communications having a protocol type selected from the group of protocol standards consisting of Bluetooth, wireless fidelity (Wi-Fi), Ultra-Wideband (UWB), and IEEE 802.11.

90. An aircraft, comprising:
 a fuselage and a plurality of passengers seats arranged within the fuselage; and
 a vehicle information system for presenting viewing content, said vehicle information system coupled with said fuselage and comprising:
  a content source for providing a packetized transport stream with a plurality of content frames in accordance with a predetermined frame sequence, each of said content frames being of a uniform type and including:
   a transport frame payload being encrypted and including preselected viewing content for which protection from unauthorized access is desirable; and
   an unencrypted transport frame header including a packet identifier field for indicating whether said transport frame payload is encrypted, a payload unit start indicator field for indicating whether said transport frame payload has a packetized elementary stream header, a transport priority field for indicating whether the selected content frame comprises an index frame and for supporting smooth jump operations within the packetized transport stream by enabling searches for index frames among said content frames within the predetermined frame sequence without decoding said transport frame payloads of said content frames, and none of the preselected viewing content, said transport frame header enabling selected content frames to be extracted without decrypting said transport frame payload of said selected content frames, said transport frame payload following said transport frame header and comprising a remainder of each content frame; and
  a plurality of passenger interfaces in communication with said content source via a distribution system, each of said passenger interfaces being disposed adjacent to a selected passenger seat and including:
   a processing system for receiving the packetized transport stream, said processing system decrypting said transport frame payload of at least one of said of content frames and providing said preselected viewing content as a video elementary stream and an audio elementary stream;
   a video presentation system for presenting the viewing content associated with said video elementary stream; and
   an audio presentation system for presenting the viewing content associated with said audio elementary stream,
 wherein all of the viewing content in the packetized transport stream remains in an encrypted format during transmission such that the preselected viewing content is protected against unauthorized access without impairing presentation of the preselected viewing content.

* * * * *